US012517508B2

(12) United States Patent
Noguchi et al.

(10) Patent No.: US 12,517,508 B2
(45) Date of Patent: Jan. 6, 2026

(54) INFORMATION TERMINAL, CONTROL SYSTEM, AND CONTROL METHOD

(71) Applicant: HONDA MOTOR CO., LTD., Tokyo (JP)

(72) Inventors: Junpei Noguchi, Tokyo (JP); Gaku Shimamoto, Tokyo (JP); Takuma Sekino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 335 days.

(21) Appl. No.: 18/099,614

(22) Filed: Jan. 20, 2023

(65) Prior Publication Data

US 2023/0236596 A1 Jul. 27, 2023

(30) Foreign Application Priority Data

Jan. 24, 2022 (JP) ................................ 2022-008956

(51) Int. Cl.
*G05D 1/00* (2024.01)
*G05D 1/223* (2024.01)
(Continued)

(52) U.S. Cl.
CPC ......... *G05D 1/0038* (2013.01); *G05D 1/2232* (2024.01); *G06F 3/04845* (2013.01); *G08G 1/096883* (2013.01)

(58) Field of Classification Search
CPC .... B62D 1/00; B62D 15/0285; G05D 1/0038; G05D 1/221; G05D 1/222; G05D 1/223;
(Continued)

(56) References Cited

U.S. PATENT DOCUMENTS

2012/0191269 A1* 7/2012 Chen .................... G05D 1/0038
701/2
2013/0268847 A1* 10/2013 Kim ...................... G06F 3/0483
715/251
(Continued)

FOREIGN PATENT DOCUMENTS

JP 2016-531340 A 10/2016
JP 7360483 B2 10/2023
(Continued)

OTHER PUBLICATIONS

Jun. 4, 2024, Translation of Japanese Office Action issued for related JP Application No. 2023-169608.

*Primary Examiner* — Adam D Tissot
*Assistant Examiner* — Aaron K Mccullers
(74) *Attorney, Agent, or Firm* — Paratus Law Group, PLLC

(57) ABSTRACT

An information terminal carried by a user of a moving object includes: a display configured to perform a position instruction operation on a display image; and a controller configured to perform movement control of the moving object based on a specific operation including a rotation instruction operation of the user on the display. After the controller causes the display to display a first guidance image that extends in a left-right direction, the controller causes the display to display, at a first position instructed by the user on the first guidance image, a second guidance image that has a length in a left-right direction shorter than that of the first guidance image and that serves as a starting point of the specific operation.

11 Claims, 16 Drawing Sheets

(51) Int. Cl.
*G06F 3/04845* (2022.01)
*G08G 1/0968* (2006.01)

(58) Field of Classification Search
CPC .. G05D 1/2232; G05D 1/2245; G05D 1/2246; G05D 1/2247; G06F 3/048; G06F 3/04842; G06F 3/04845; G06F 3/04847; G06F 3/0485; G06F 3/0488; G06F 3/04883; G08G 1/096877; G08G 1/096883
USPC ....... 379/102.01; 455/11.1, 420; 701/2, 517; 725/25, 28, 37, 39
See application file for complete search history.

(56) References Cited

U.S. PATENT DOCUMENTS

| | | | | |
|---|---|---|---|---|
| 2017/0109011 | A1 | 4/2017 | Jiang | |
| 2018/0302786 | A1 | 10/2018 | Yu et al. | |
| 2019/0258247 | A1* | 8/2019 | Bando | B62D 1/00 |
| 2019/0310624 | A1* | 10/2019 | Bettger | B62D 15/0285 |
| 2020/0041992 | A1* | 2/2020 | Nagashima | G06F 3/04847 |
| 2020/0257284 | A1 | 8/2020 | Hassani et al. | |
| 2020/0393825 | A1 | 12/2020 | Golgiri et al. | |
| 2022/0342415 | A1* | 10/2022 | Suzuki | G05D 1/223 |
| 2023/0236596 | A1 | 7/2023 | Noguchi et al. | |

FOREIGN PATENT DOCUMENTS

| | | | |
|---|---|---|---|
| WO | WO 2018/116978 | A1 | 6/2018 |
| WO | WO 2019/163165 | A1 | 8/2019 |
| WO | WO 2021/048582 | A1 | 3/2021 |

* cited by examiner

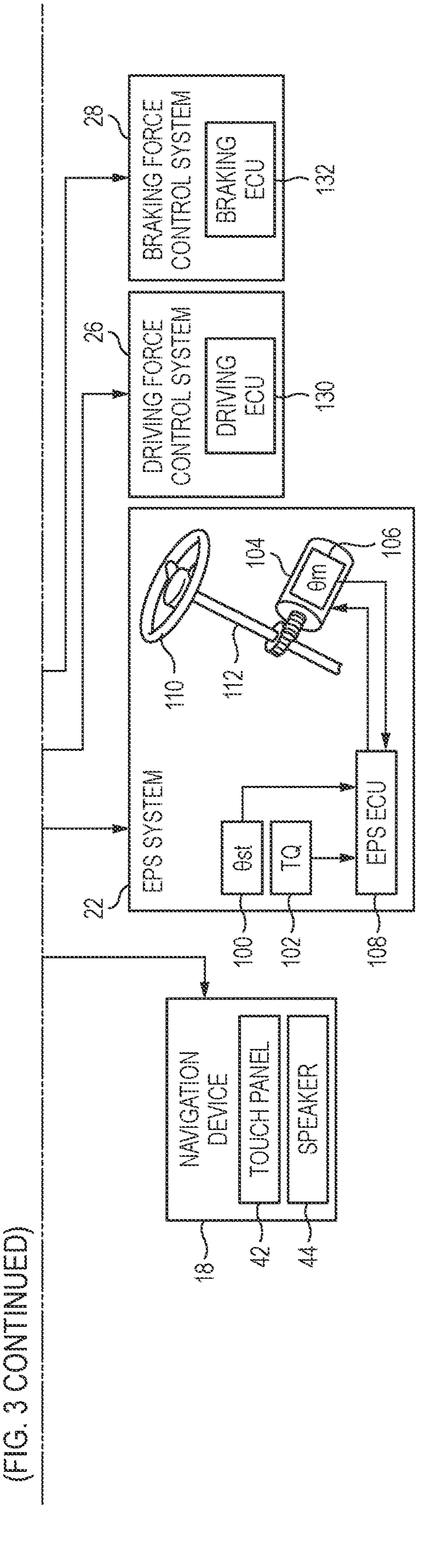
(FIG. 3 CONTINUED)

INFORMATION TERMINAL, CONTROL SYSTEM, AND CONTROL METHOD

CROSS-REFERENCE TO RELATED APPLICATIONS

This application is based on and claims priority under 35 USC 119 from Japanese Patent Application No. 2022-008956 filed on Jan. 24, 2022, the contents of which are incorporated herein by reference.

TECHNICAL FIELD

The present disclosure relates to an information terminal, a control system, and a. control method.

BACKGROUND ART

In recent years, improvements in traffic safety are required to make cities and human settlements inclusive, safe, resilient, and sustainable. In a vehicle, from a viewpoint of improving traffic safety, for example, it is required to ensure traffic safety even if an abnormality occurs in the vehicle, In the related art, a remote-parking system that remotely controls a vehicle by using a smartphone to park the vehicle in a designated predetermined parking space or to cause the vehicle to leave the parking space is known. Pamphlet of International Patent Publication No. WO2019/163165A1 (hereinafter, referred to as Patent Literature 1) discloses a mobile device in which when a user uses the mobile device to park a vehicle in a parking space by remote control, guidance such as a message or a pattern for the remote control is displayed on a screen.

According to the mobile device of Patent Literature 1, by operating the mobile device according to the guidance display, the vehicle can be parked in the parking space.

However, there is room for further improvement in guidance content displayed on the mobile device in terms of easiness of viewing, ease of operation, and the like.

An object of the present disclosure is to provide an information terminal that can improve operability when performing movement control.

SUMMARY

A first aspect of the present disclosure relates to an information terminal carried by a user of a moving object, the information terminal including:

a display configured to perform a position instruction operation on a display image; and a controller configured to perform movement control of the moving object based on a specific operation including a rotation instruction operation of the user on the display, in which after the controller causes the display to display a first guidance image that extends in a left-right direction, the controller causes the display to display, at a first position instructed by the user on the first guidance image, a second guidance image that has a length in a left-right direction shorter than that of the first guidance image and that serves as a starting point of the specific operation, A second aspect of the present disclosure relates to a control system including:

an information terminal that is carried by a user of a moving object, that includes a display configured to perform a position instruction operation on a display image, and that performs movement control of the moving object based on a specific operation including a rotation instruction operation of the user on the display; and a control device configured to cause the moving object to move according to the movement control, in which after the information terminal causes the display to display a first guidance image that extends in a left-right direction, the information terminal causes the display to display, at a first position instructed by the user on the first guidance image, a second guidance image that has a length in a left-right direction shorter than that of the first guidance image and that serves as a starting point of the specific operation.

A third aspect of the present disclosure relates to a control method by an information terminal that is carried by a user of a moving object, and that includes a display configured to perform a position instruction operation on a display image, and a controller configured to perform movement control of the moving object based on a specific operation including a rotation instruction operation of the user on the display, the control method including:

causing, by the controller, the display to display a first guidance image that extends in a left-right direction, and causing, by the controller, the display to display, at a first position instructed by the user on the first guidance image, a second guidance image that has a length in a left-right direction shorter than that of the first guidance image and that serves as a starting point of the specific operation.

According to the present disclosure, it is possible to provide an information terminal, a control system, and a control method that can improve operability when performing movement control.

BRIEF DESCRIPTION OF DRAWINGS

Exemplary embodiment(s) of the present invention will be described in detail based on the following figures, wherein.

DESCRIPTION OF EMBODIMENTS

Figure 1:
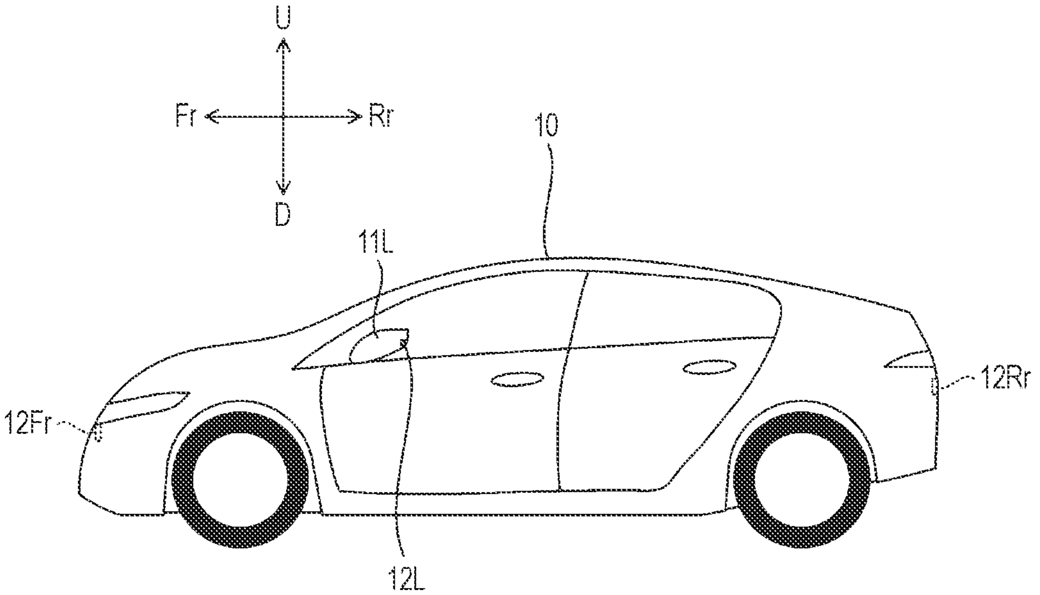
FIG. 1 is a side view showing an example of a vehicle whose movement is controlled by an information terminal according to the present embodiment.

Hereinafter, an embodiment of an information terminal of the present disclosure will be described with reference to the accompanying drawings. The drawings are to be viewed in directions of reference signs. Further, in the present specification and the like, in order to simplify and clarify description, a front-rear direction, a left-right direction, and an upper-lower direction are described according to directions viewed from a driver of a vehicle 10 shown in FIGS. 1 and 2. In the drawings, a front side of the vehicle 10 is denoted by Fr, a rear side thereof is denoted by Rr, a left side thereof is denoted by L, a right side thereof is denoted by R, an upper side thereof is denoted by U, and a lower side thereof is denoted by D.

<Vehicle 10 Whose Movement is Controlled by Information Terminal of Present disclosure>

Figure 2:
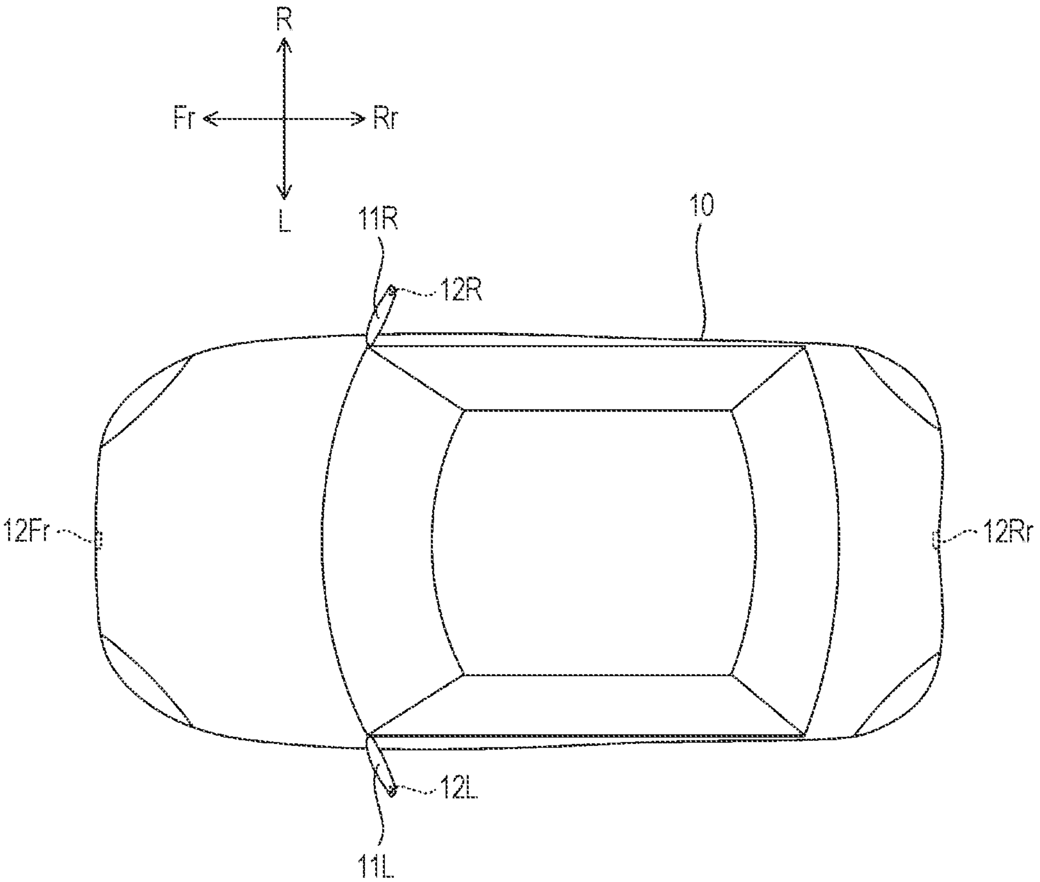
FIG. 2 is a top view of the vehicle shown in FIG. 1.

FIG. 1 is a side view of the vehicle TO whose movement is controlled by the information terminal of the present disclosure. FIG. 2 is a top view of the vehicle 10 shown in FIG. 1. The vehicle 10 is an example of a moving object of the present disclosure.

The vehicle 10 is an automobile that includes a driving source (not shown), and wheels including driven wheels driven by power of the driving source and turning wheels that can be turned. In the present embodiment, the vehicle 10 is a four-wheel automobile including a pair of left and right front Wheels and a pair of left and right rear wheels. The driving source of the vehicle 10 is, for example, an electric motor. The driving source of the vehicle 10 may be an internal combustion engine such as a gasoline engine or a diesel engine, or may be a combination of the electric motor and the internal combustion engine. Further, the driving source of the vehicle 10 may drive the pair of left and right front wheels, the pair of left and right rear wheels, or the four wheels including the pair of left and right front wheels and the pair of left and right rear wheels. Both the front wheels and the rear wheels may be the turning wheels that can be turned, or either one of the front wheels and the rear wheels may be the turning wheels that can be turned.

The vehicle 10 further includes side mirrors 11L and 11R. The side minors 11L and 11R are mirrors (rear-view mirrors) that are provided at outer sides of front seat doors of the vehicle 10 and that are for the driver to check a rear side and a rear lateral side. Each of the side mirrors 11L and 11R is fixed to a main body of the vehicle 10 by a rotation shaft that extends in a perpendicular direction, and can be opened and dosed by rotating around the rotation shaft.

The vehicle 10 further includes a front camera 12Fr, a rear camera 12Rr, a left-side camera 12L, and a right-side camera 12R The front camera 12Fr is a digital camera that is provided at a front portion of the vehicle 10 and that images a front side of the vehicle 10. The rear camera 12Rr is a digital camera that is provided at a rear portion of the vehicle 10 and that images a rear side of the vehicle 10. The left-side camera 12L is a digital camera that is provided at the left side mirror 11L of the vehicle 10, and that images a left side of the vehicle 10. The right-side camera 12R is a digital camera that is provided at the right side mirror 11R of the vehicle 10, and that images a right side of the vehicle 10.

<Internal Configuration of Vehicle 10>

Figure 3:
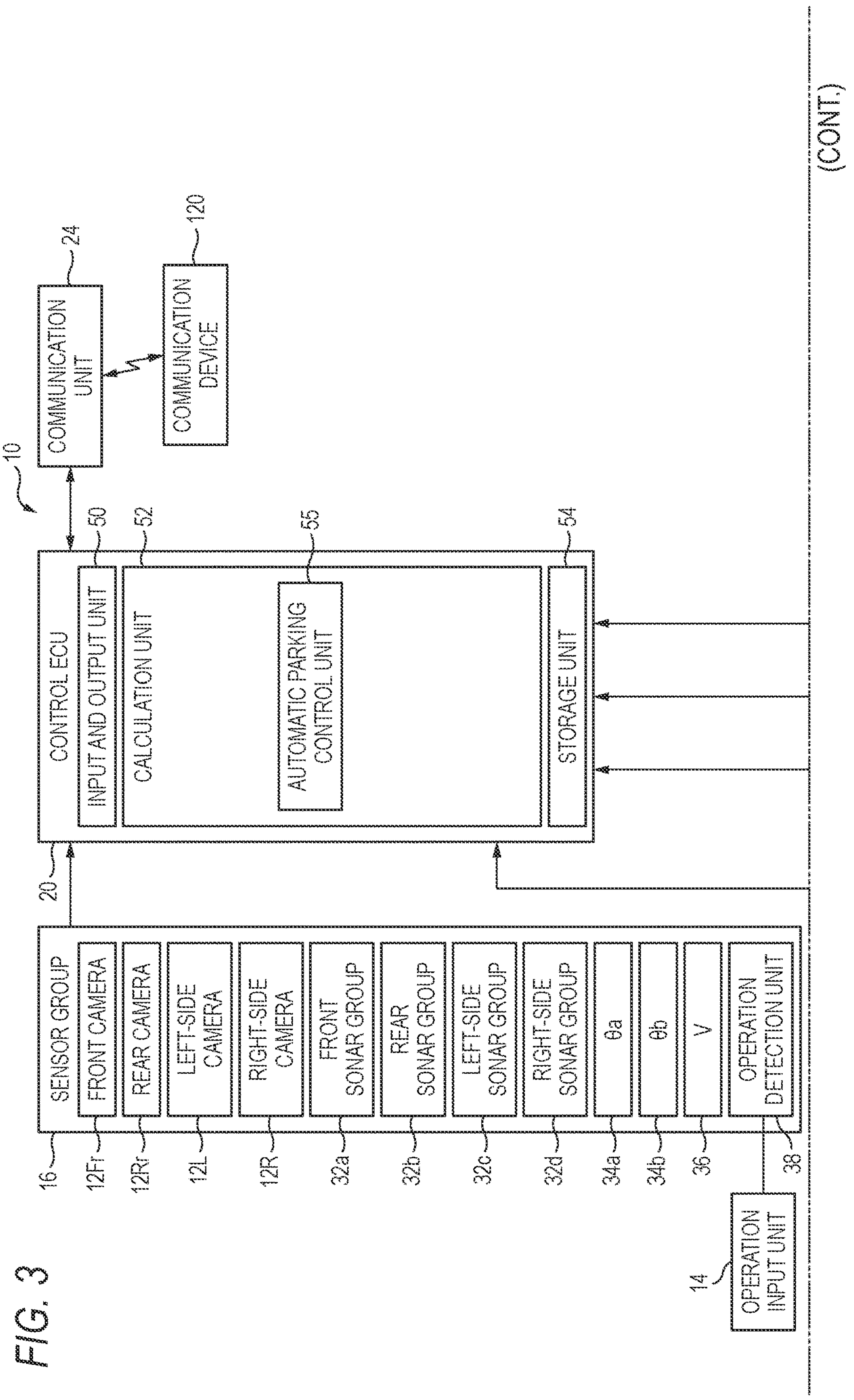
FIG. 3 is a block diagram showing an internal configuration of the vehicle shown in FIG. 1.

FIG. 3 is a block diagram showing an example of an internal configuration of the vehicle 10 shown in FIG. 1. As shown in FIG. 3, the vehicle 10 includes a sensor group 16, a navigation device 18, a control electronic control unit (ECU) 20, an electric power steering (EPS) system 22, and a communication unit 24. The vehicle 10 further includes a driving force control system 26 and a braking force control system 28.

The sensor group 16 acquires various detection values used for control performed by the control ECU 20. The sensor group 16 includes the front camera 12Fr, the rear camera 12Rr, the left-side camera 12L, and the right-side camera 12R. Further, the sensor group 16 includes a front sonar group 32*a*, a rear sonar group 32*b*, a left-side sonar group 32*c*, and a right-side sonar group 32*d*. Further, the sensor group 16 includes wheel sensors 34*a* and 34*b*, a vehicle speed sensor 36, and an operation detection unit 38.

The front camera 12Fr, the rear camera 12Rr, the left-side camera 12L, and the right-side camera 12R acquire recognition data (for example, a surrounding image) for recognizing an outside of the vehicle 10 by imaging surroundings of the vehicle 10. Surrounding images captured by the front camera 12Fr, the rear camera 12Rr, the left-side camera 12L, and the right-side camera 12R are referred to as a front image, a rear image, a left-side image, and a right-side image, respectively. An image implemented by the left-side image and the right-side image may be referred to as a side image.

The front sonar group 32*a*, the rear sonar group 32*b*, the left-side sonar group 32*c*, and the right-side sonar group 32*d* emit sound waves to the surroundings of the vehicle 10, and receive reflected sounds from other objects. The front sonar group 32*a* includes, for example, four sonars. The sonars that constitute the front sonar group 32*a* are provided on an obliquely left front side, a front left side, a front right side, and an obliquely right front side of the vehicle 10, respectively. The rear sonar group 32*b* includes, for example, four sonars. The sonars that constitute the rear sonar group 32*b* are provided on an obliquely left rear side, a rear left side, a rear right side, and an obliquely right rear side of the vehicle 10, respectively. The left-side sonar group 32*c* includes, for example, two sonars. The sonars that constitute the left-side sonar group 32*c* are provided on a left-side-portion front side and a left-side-portion rear side of the vehicle 10, respectively. The right-side sonar group 32*d* includes, for example, two sonars. The sonars that constitute the right-side sonar group 32*d* are provided on a right-side-portion front side and a right-side-portion rear side of the vehicle 10, respectively.

The wheel sensors 34*a* and 34*b* detect rotation angles of the wheels of the vehicle 10. The wheel sensors 34*a* and 34*b* may be implemented by angle sensors or displacement sensors. The wheel sensors 34*a* and 34*b* output detection pulses every time the wheels rotate at predetermined angles. The detection pulses output from the wheel sensors 34*a* and 34*b* are used for calculating the rotation angles of the wheels and rotation speeds of the wheels. A movement distance of the vehicle 10 is calculated based on the rotation angles of the wheels. The wheel sensor 34*a* detects, for example, a rotation angle θa of the left rear wheel. The wheel sensor 34*b* detects, for example, a rotation angle θb of the right rear wheel.

The vehicle speed sensor 36 detects a speed of a vehicle body of the vehicle 10, that is, a vehicle speed V, and outputs the detected vehicle speed V to the control ECU 20. The vehicle speed sensor 36 detects the vehicle speed V based on, for example, rotation of a transmission countershaft.

The operation detection unit 38 detects content of an operation performed by a user using an operation input unit 14, and outputs the detected content of the operation to the control ECU 20. The operation input unit 14 includes, for example, various user interfaces such as a side mirror switch for switching between an opened state and a closed state of the side mirrors 11L, and 11R, and a shift lever (a select lever or a selector).

The navigation device 18 detects a current position of the vehicle 10 and guides the user to a route to a destination by using, for example, a global positioning system (GPS). The navigation device 18 includes a storage device (not shown) provided with a map information database.

The navigation device 18 includes a touch panel 42 and a speaker 44. The touch panel 42 functions as an input device and a display device of the control ECU 20. The speaker 44 outputs various pieces of guidance information by sound to the user of the vehicle 10.

The touch panel 42 is implemented such that various commands can be input to the control ECU 20. For example, the user can input a command related to movement support of the vehicle 10 via the touch panel 42. The movement support includes parking support and parking-space-leaving support of the vehicle 10. Further, the touch panel 42 is implemented such that various screens related to control content of the control ECU 20 are displayed. For example, a screen related to the movement support of the vehicle 10 is displayed on the touch panel 42. Specifically, a parking support button for requesting the parking support of the vehicle 10 and a parking-space-leaving support button for requesting the parking-space-leaving support of the vehicle 10 are displayed on the touch panel 42. The parking support button includes an automatic parking button for requesting parking by automatic steering of the control ECU 20 and an assistance parking button for requesting assistance when parking by an operation of the driver. The parking-space-leaving support button includes an automatic parking-space-leaving button for requesting parking-space-leaving by the automatic steering of the control ECU 20 and an assistance parking-space-leaving button for requesting assistance when performing the parking-space-leaving by the operation of the driver. Components other than the touch panel 42, for example, a smartphone or a tablet terminal may be used as an input device or a display device.

The control ECU 20 includes an input and output unit 50, a calculation unit 52, and a storage unit 54. The calculation unit 52 is implemented by, for example, a central processing unit (CPU). The calculation unit 52 performs various controls by controlling units based on a program stored in the storage unit 54. Further, the calculation unit 52 inputs and outputs a signal from and to units connected to the control ECU 20 via the input and output unit 50.

The calculation unit 52 includes an automatic parking control unit 55 for performing movement execution control of the vehicle 10. The automatic parking control unit 55 performs automatic parking support and automatic parking-space-leaving support of the vehicle 10 by automatic steering in which an operation of a steering 110 is automatically performed under control of the automatic parking control unit 55. In the automatic parking support and the automatic parking-space-leaving support, an accelerator pedal (not shown), a brake pedal (not shown), and the operation input unit 14 are automatically operated. Further, the automatic parking control unit 55 performs the assistance parking support and the assistance parking-space-leaving support when the driver operates the accelerator pedal, the brake pedal, and the operation input unit 14 to manually park the vehicle 10 and manually cause the vehicle 10 to leave a parking space.

For example, based on the recognition data. of the outside of the vehicle 10 acquired by the front camera 12Fr, the rear camera 12Rr, the left-side camera 12L, and the right-side camera 12R and a predetermined parking space designated by the user, the automatic parking control unit 55 controls automatic parking of parking the vehicle 10 in the designated predetermined parking space and automatic parking-space-leaving of causing the vehicle 10 to leave the predetermined parking space.

The automatic parking control unit 55 registers the predetermined parking space designated by the user in the storage unit 54 as a designated parking space. Based on the recognition data of the outside of the vehicle 10 acquired by the front camera 12Fr, the rear camera 12Rr, the left-side camera 12L, and the right-side camera 12R, the automatic parking control unit 55 registers feature points related to the designated parking space in the storage unit 54. Based on the recognition data of the outside of the vehicle 10 and the feature points of the designated parking space designated by the user, the automatic parking control unit 55 controls automatic parking of parking the vehicle 10 in the designated parking space and automatic parking-space-leaving of causing the vehicle 10 to leave the designated parking space.

An EPS system 22 includes a steering angle sensor 100, a torque sensor 102, an EPS motor 104, a resolver 106, and an EPS ECU 108. The steering angle sensor 100 detects a. steering angle θst of the steering 110. The torque sensor 102 detects a torque TQ applied to the steering 110.

The EPS motor 104 enables operation support of the steering 110 operated by an occupant and the automatic steering during the parking support by applying a driving force or a reaction force to a steering column 112 coupled to the steering 110. The resolver 106 detects a rotation angle Θm of the EPS motor 104. The EPS ECU 108 controls the entire EPS system 22. The EPS ECU 108 includes an input and output unit (not shown), a calculation unit (not shown), and a storage unit (not shown).

The communication unit 24 enables wireless communication between the communication unit 24 and another communication apparatus 120. The other communication apparatus 120 is a base station, a communication device of another vehicle, a smartphone or a tablet terminal carried by the user of the vehicle 10, or the like. The smartphone and the tablet are examples of the information terminal of the present disclosure.

The driving force control system 26 includes a driving ECU 130. The driving force control system 26 executes driving force control of the vehicle 10. The driving ECU 130 controls a driving force of the vehicle 10 by controlling an engine (not shown) and the like based on an operation performed by the user on the accelerator pedal (not shown).

The braking force control system 28 includes a braking ECU 132, The braking force control system 28 executes braking force control of the vehicle 10. The braking ECU 132 controls a braking force of the vehicle 10 by controlling a brake mechanism (not shown) and the like based on an operation performed by the user on the brake pedal (not shown).

Figure 4:
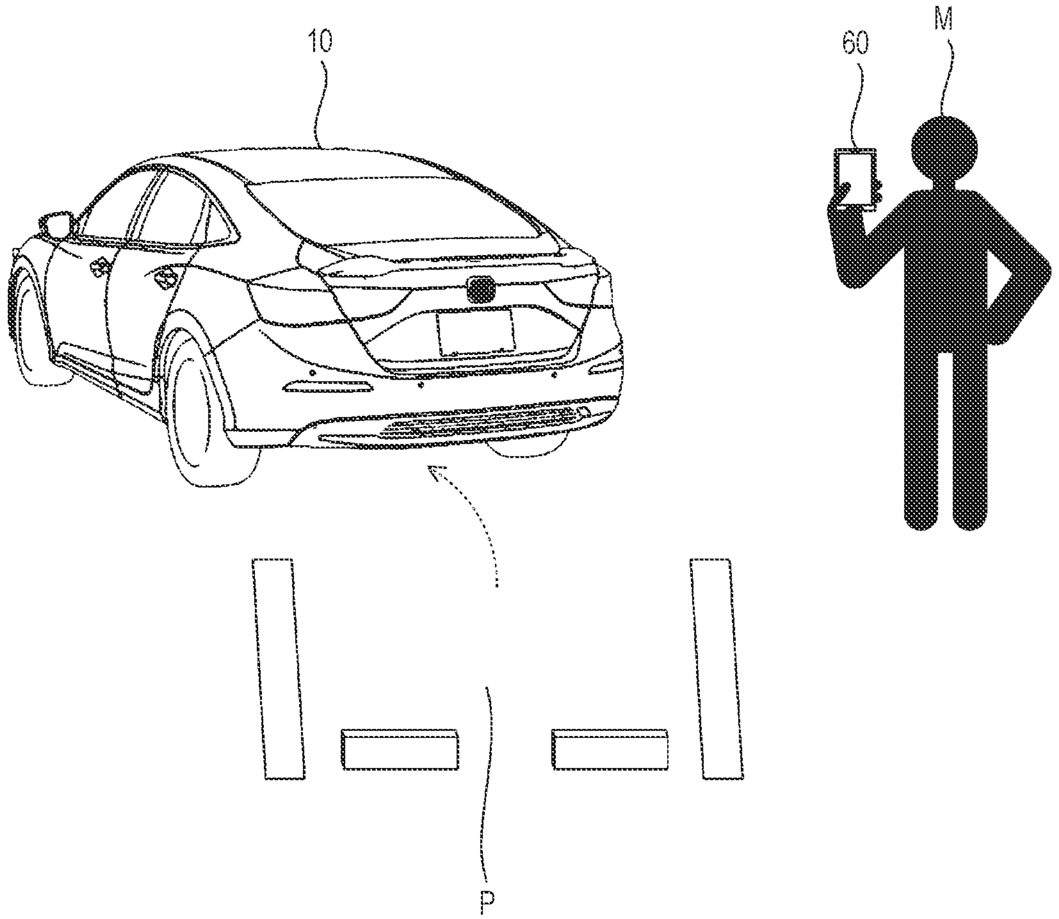
FIG. 4 is a diagram showing a state where the vehicle is under parking-space-leaving instruction control by using a smartphone from an outside of the vehicle.

FIG. 4 is a diagram showing an example of a state where a user M of the vehicle 10 performs movement instruction control of causing the vehicle 10 to automatically leave a parking space P by using a smartphone 60 carried by the user M from an outside of the vehicle 10. The movement instruction control is an example of the movement control of the present disclosure. The movement instruction control includes, for example, parking instruction control of automatically parking the vehicle 10 in the parking space P and parking-space-leaving instruction control of causing the vehicle 10 to automatically leave the parking space P. An example shown in FIG. 4 shows a state where the vehicle 10 is under the parking-space-leaving instruction control.

When a smartphone screen 61 (see FIG. 6 and the like) implemented as a touch panel is touched by the user M, the smartphone 60 transmits an instruction signal for instructing automatic parking-space-leaving of the vehicle 10 to the vehicle 10 by wireless communication. For example, Bluetooth® Low Energy (BLE) is used as the wireless communication. The vehicle 10 receives the transmitted instruction signal from the smartphone 60 through the communication unit 24. The automatic parking control unit 55 of the vehicle 10 controls the automatic parking-space-leaving of the vehicle 10 according to the instruction signal received through the communication unit 24.

Figure 5:
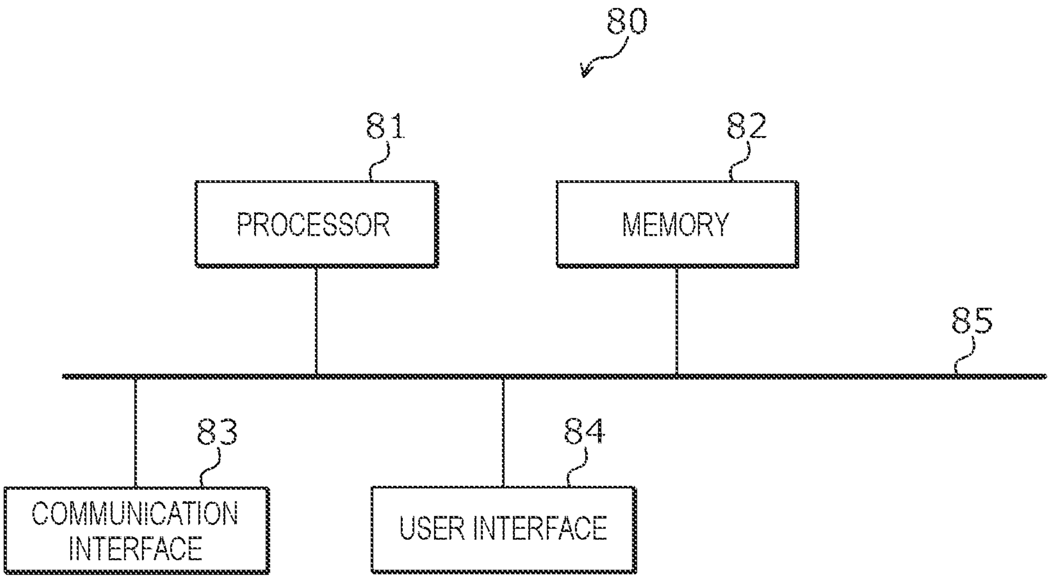
FIG. 5 is a diagram showing an example of a hardware configuration of the smartphone.

FIG. 5 is a diagram showing an example of a hardware configuration of the smartphone 60. The smartphone 60 can be implemented by, for example, an information processing apparatus 80 shown in FIG. 5. The information processing apparatus 80 includes a processor 81, a memory 82, a communication interface 83, and a user interface 84. The processor 81, the memory 82, the communication interface 83, and the user interface 84 are connected by, for example, a bus 85.

The processor 81 is a circuit that performs signal processing, and is, for example, a central processing unit (CPU) that controls the entire information processing apparatus 80. The processor 81 is an example of a control unit of the present disclosure. The processor 81 may be implemented by another digital circuit such as a field programmable gate array (FPGA) or a digital signal processor (DSP). Further, the processor 81 may be implemented by combining a plurality of digital circuits.

The memory 82 includes, for example, a main memory and an auxiliary memory. The main memory is, for example, a random access memory (RAM). The main memory is used as a work area of the processor 81.

The auxiliary memory is, for example, a non-volatile memory such as a magnetic disk, an optical disk, or a flash memory. Various programs that cause the information processing apparatus 80 to operate are stored in the auxiliary memory. The program stored in the auxiliary memory is loaded in the main memory and executed by the processor 81.

The auxiliary memory may include a portable memory removable from the information processing apparatus 80. Examples of the portable memory include a universal serial bus (USB) flash drive, a memory card such as a secure digital (SD) memory card, and an external hard disk drive.

The communication interface 83 is a communication interface that performs wireless communication with an outside of the information processing apparatus 80 (for example, the communication unit 24 of the vehicle 10). The communication interface 83 is controlled by the processor 81.

The user interface 84 includes, for example, an input device that receives an operation input from the user M and an output device that outputs information to the user M. The input device can be implemented by, for example, a touch panel. The output device can be implemented by, for example, a display or a speaker. The user interface 84 is controlled by the processor 81.

For example, the processor 81 performs movement instruction control for instructing movement of the vehicle 10. Specifically, the processor 81 performs the movement instruction control of the vehicle 10 based on a specific operation of the user M on a screen of the smartphone 60. The specific operation includes a continuous position instruction operation (for example, a swiping operation), a rotation instruction operation in a predetermined rotation direction (for example, a rotational swiping operation), and the like. Further, the processor 81 performs control of generating a guidance image that prompts the instruction operation of the user M on the smartphone screen 61 of the smartphone 60 and displaying the generated guidance image on the smartphone screen 61.

<Movement Instruction Control Performed by Processor 81>

Next, an example of the movement instruction control of the vehicle 10 performed by the processor 81 of the smartphone 60 will be described with reference to FIGS. 6 to 14.

Figure 6:
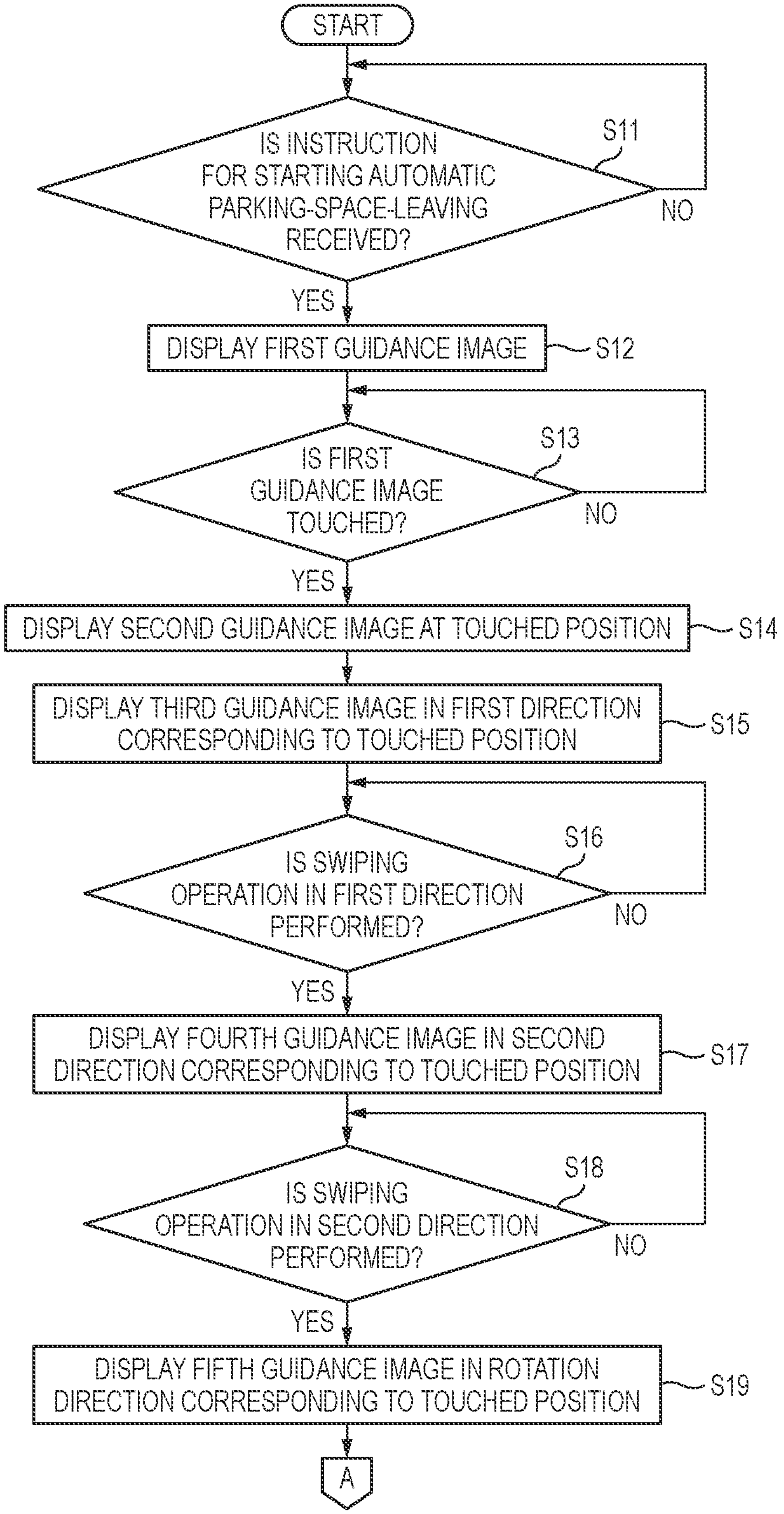
FIG. 6 is a flowchart showing parking-space-leaving instruction control of the vehicle performed by a processor.
Figure 7:
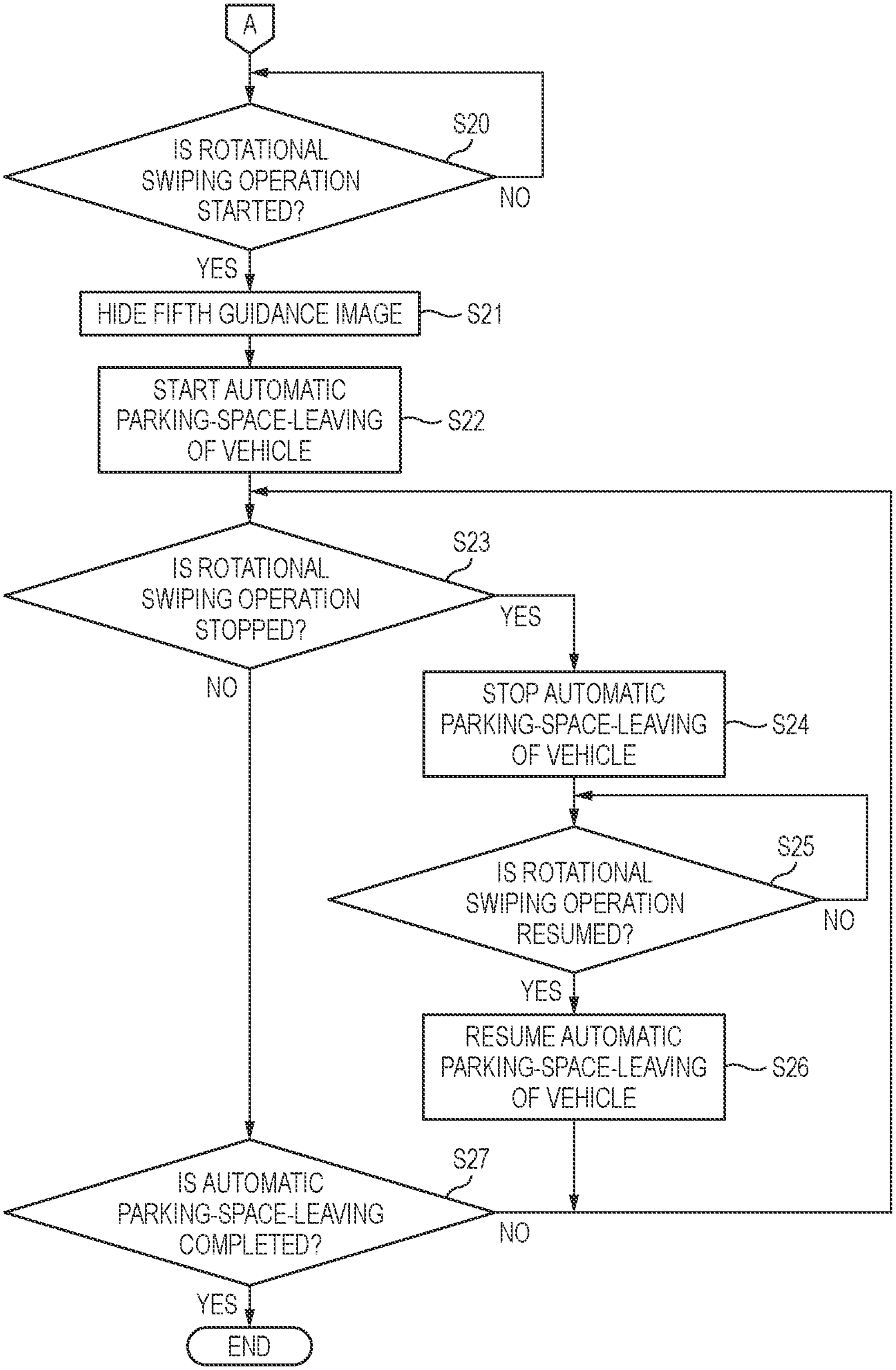
FIG. 7 is a flowchart showing the parking-space-leaving instruction control of the vehicle performed by the processor.

FIGS. 6 and 7 are flowcharts showing the parking-space-leaving instruction control of the vehicle 10 performed by the processor 81 of the smartphone 60. FIGS. 8 to 14 are diagrams showing examples of images displayed on the smartphone screen 61 of the srnartphone 60 that performs the parking-space-leaving instruction control on the vehicle 10.

The processing shown in FIG. 6 is started, for example, when an automatic parking-space-leaving button (not shown) displayed on the smartphone screen 61 of the smartphone 60 is touched. The smartphone screen 61 is an example of a display unit of the present disclosure. The parking-space-leaving instruction control is executed, for example, in a situation as shown in FIG. 4 in which the user M intends to cause the vehicle 10 to automatically leave the parking space P by using the smartphone 60.

The processor 81 determines whether an automatic parking-space-leaving instruction for instructing a start of automatic parking-space-leaving is received (step S11), In step S11, when the automatic parking-space-leaving instruction is not received (step S11: No), the processor 81 repeats the processing of step S11 and waits until the automatic parking-space-leaving instruction is received.

In step S11, when the automatic parking-space-leaving instruction is received (step S11: Yes), the processor 81 displays a first guidance image 62 for guiding an instruction operation of the automatic parking-space-leaving on the smartphone screen 61 (step S12).

Figure 8:
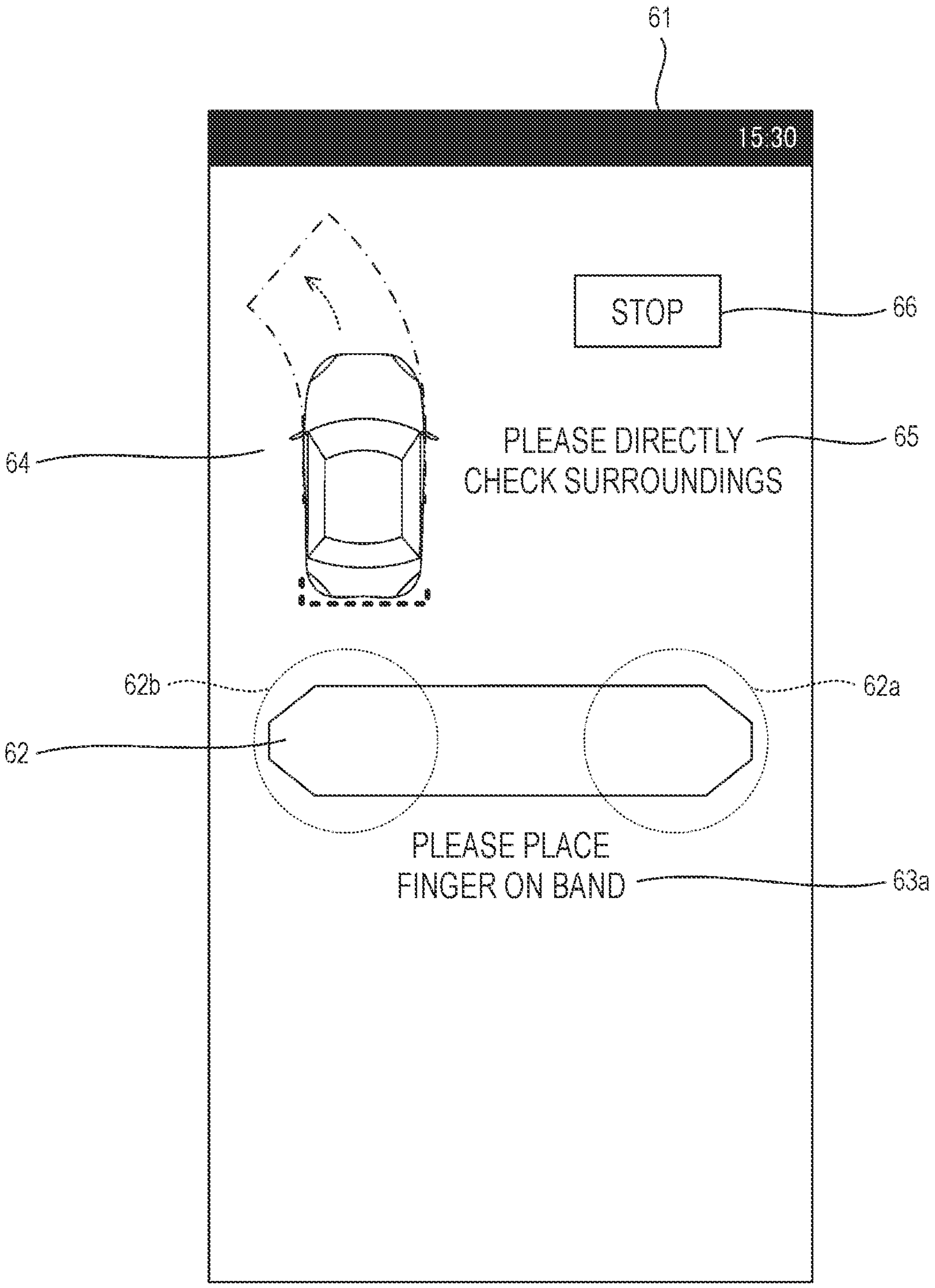
FIG. 8 is a diagram showing an example of an image displayed on the smartphone that performs parking-space-leaving instruction control on the vehicle.
Figure 9:
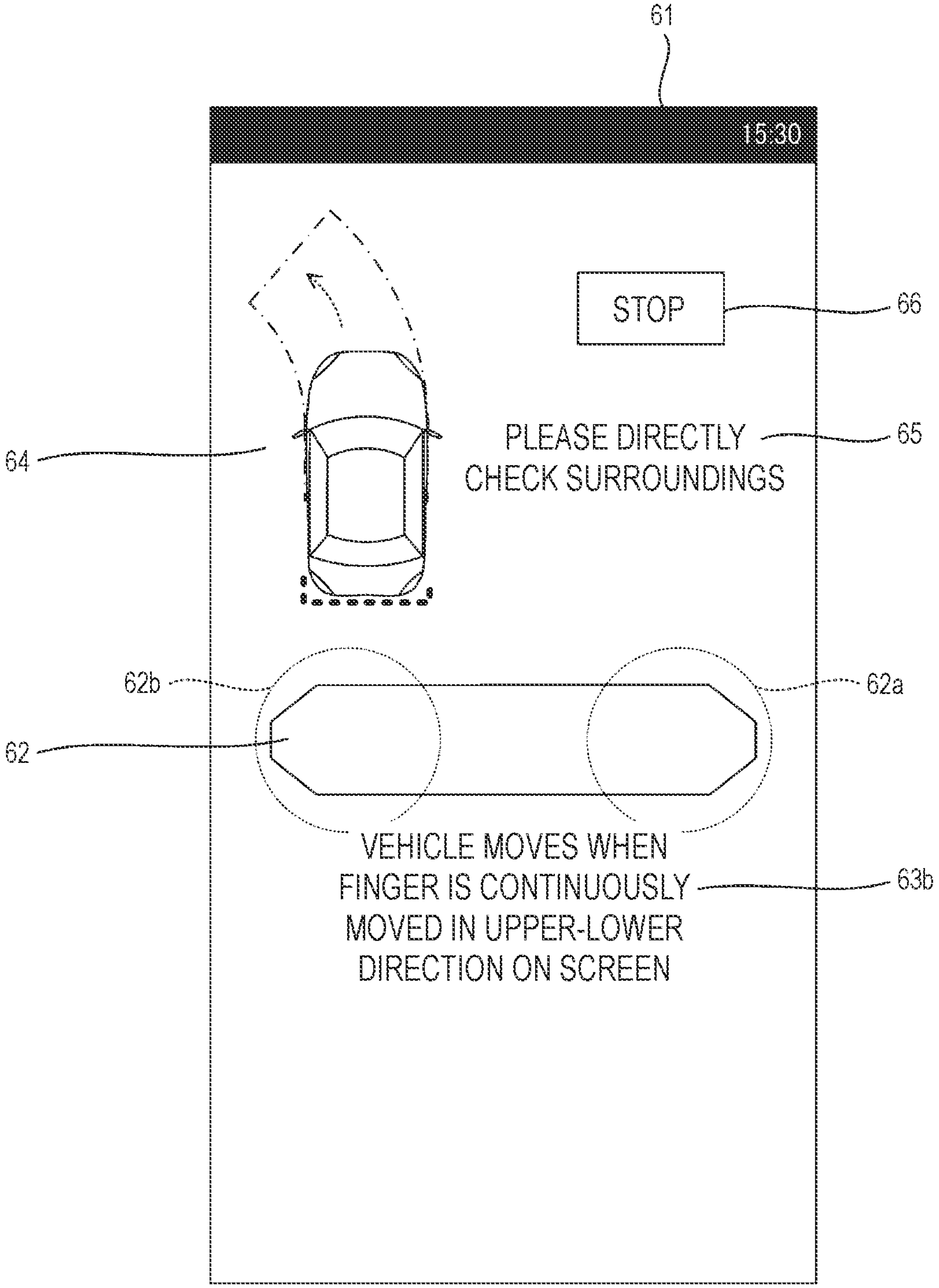
FIG. 9 is a diagram showing an example of an image displayed on the smartphone that performs the parking-space-leaving instruction control on the vehicle.

As shown in FIGS. 8 and 9, the first guidance image 62 is displayed as, for example, a long horizontal bar that extends in a left-right direction on the smartphone screen 61. Upper-lower and left-right directions of the smartphone screen 61 are, for example, directions based on a direction of characters displayed on the smartphone screen 61. Below the first guidance image 62 on the smartphone screen 61, a guidance message 63a (see FIG. 8) of operation guidance indicating that "please place finger on band (long horizontal bar)" and a guidance message 63b (see FIG. 9) of the operation guidance indicating that "vehicle moves when finger is continuously moved in upper-lower direction on screen" are alternately displayed, The first guidance image 62 is displayed at a substantially central portion of the smartphone screen 61 in an upper-lower direction. Further, an execution state image 64 showing an execution state of the parking-space-leaving instruction control on the vehicle 10 is displayed above the first guidance image 62 on the smartphone screen 61. Further, an attention message 65 indicating that "please directly check surroundings" for drawing attention from the user M who performs an instruction operation, and a stop button 66 for stopping the automatic parking-space-leaving control are displayed on a right side of the execution state image 64.

Next, the processor 81 determines whether the first guidance image 62 displayed in step S12 is touched (step S13). Specifically, the processor 81 determines whether the finger is placed on the first guidance image 62 (long horizontal bar).

In step S13, when the first guidance image 62 is not touched (step S13: No), the processor 81 repeats the processing of step S13 and waits until the first guidance image 62 is touched.

In step S13, when the first guidance image 62 is touched (step S13: Yes), the processor 81 displays a second guidance image 67*a* or a second guidance image 67*b* at a touched position (step S14).

Figure 10:
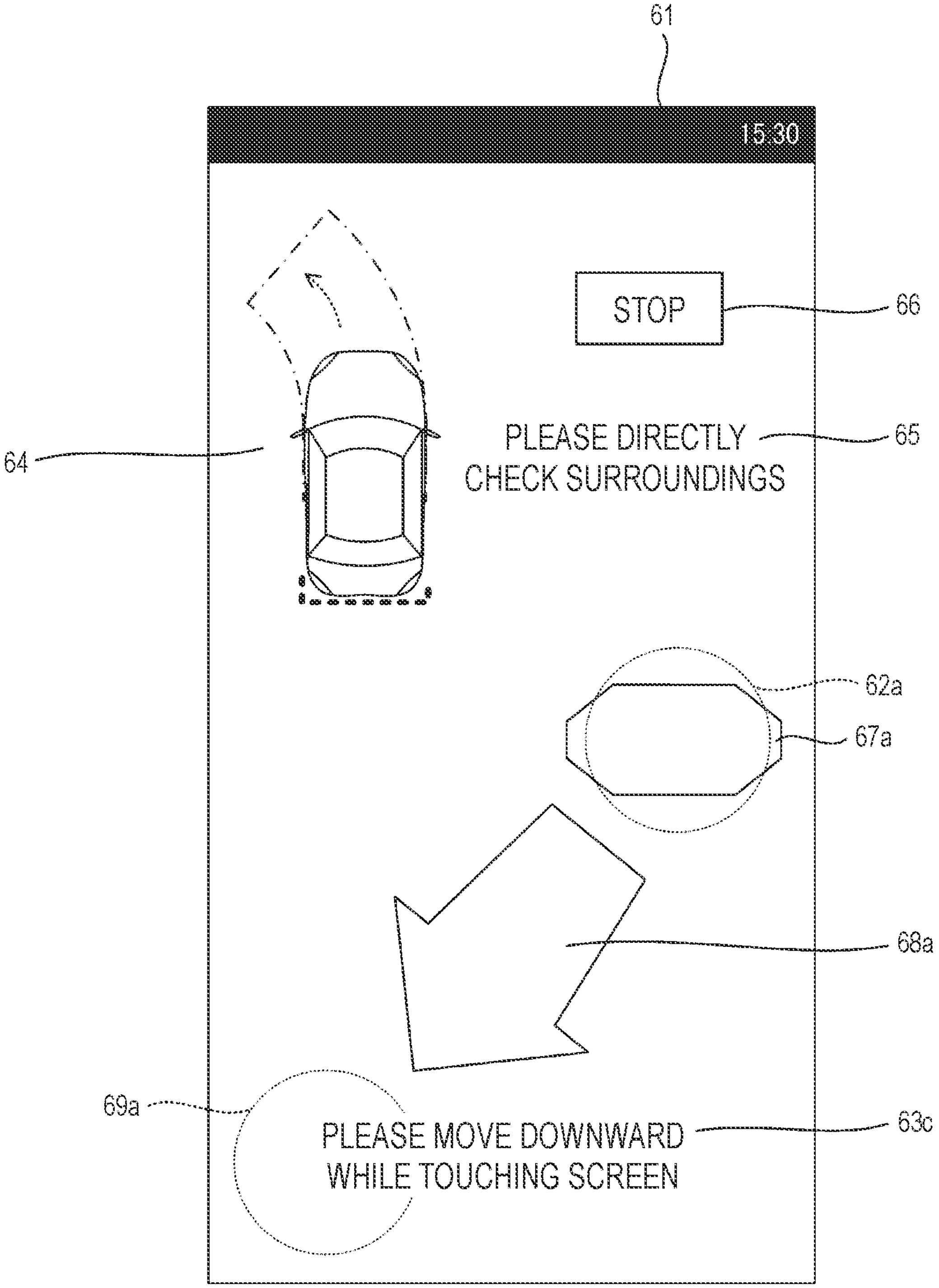
FIG. 10 is a diagram showing an example of an image displayed on the smartphone that performs the parking-space-leaving instruction control on the vehicle.
Figure 11:
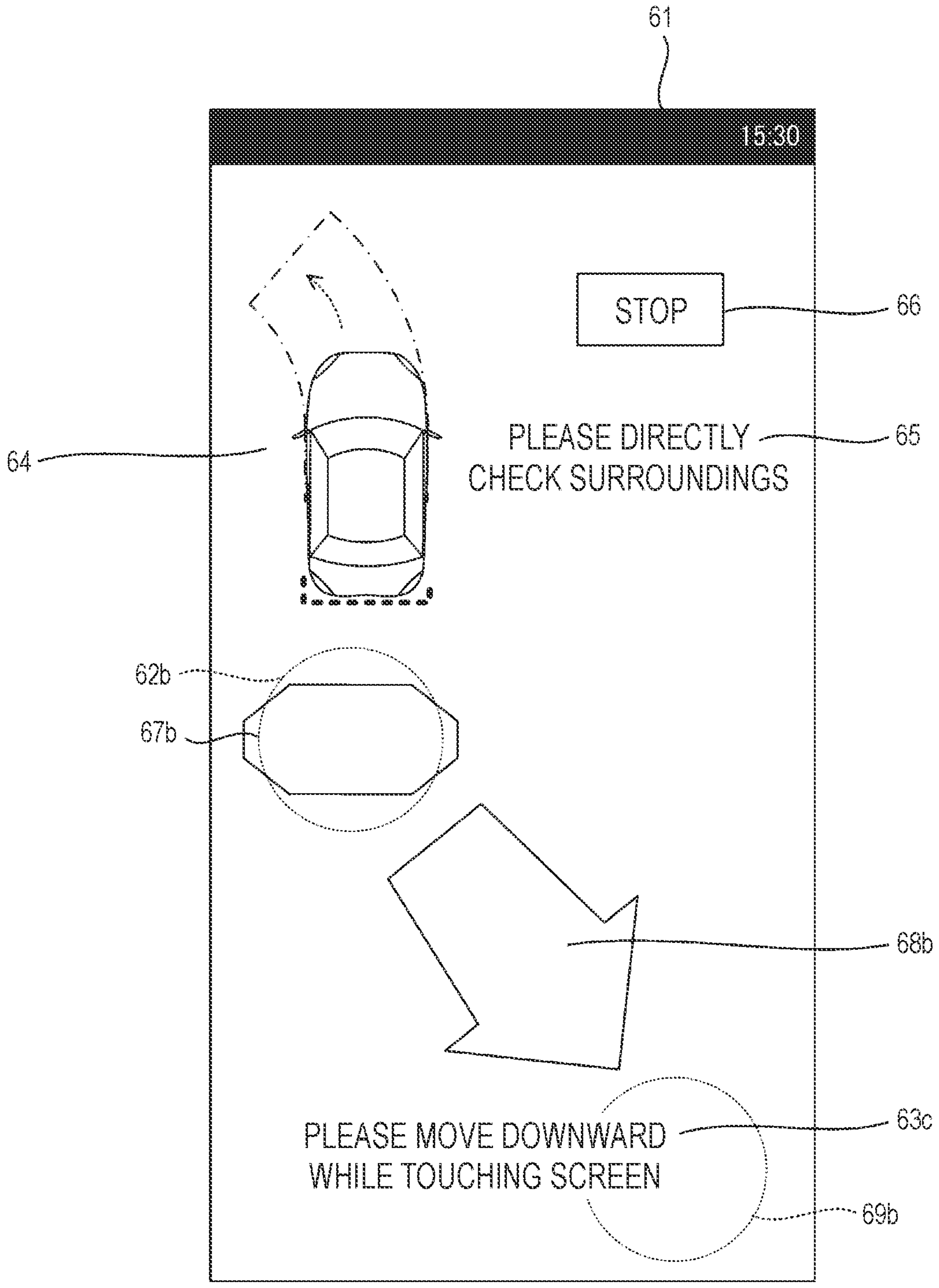
FIG. 11 is a diagram showing an example of an image displayed on the smartphone that performs the parking-space-leaving instruction control on the vehicle.

As shown in FIGS. 10 and 11, for example, the second guidance images 67*a* and 67*b* are displayed as horizontal bars having lengths in the left-right direction shorter than that of the first guidance image 62 at first positions 62*a* and 62*b* touched by the user M (where the finger is placed) on the first guidance image 62. The second guidance image 67*a* shown in FIG. 10 is a guidance image displayed when the user M touches the first position 62*a* that is a portion close to a right side of the first guidance image 62. The second guidance image 67*b* shown in FIG. 11 is a guidance image displayed when the user M touches the first position 62*b* that is a portion close to a left side of the first guidance image 62.

Next, the processor 81 displays a third guidance image 68*a*, 68*b* directed in a first direction corresponding to the position at which the second guidance image 67*a*, 67*b* is displayed in step S14, that is, the position touched by the user M (step S15).

The first direction corresponding to the position at which the second guidance image 67*a* is displayed is a direction corresponding to the first position 62*a* close to the right side touched by the user M on the first guidance image 62, for example, in a case shown in FIG. 10. is a direction including a left side direction bilaterally symmetrical to the first position 62*a* close to the right side. Specifically, as in the example shown in FIG. 10, the first direction is a direction directed in a second position 69*a* provided in an obliquely lower left region with respect to the first position 62*a*. Similarly, the first direction corresponding to the position at which the second guidance image 67*b* is displayed is a direction corresponding to the first position 62*b* close to the left side touched by the user M on the first guidance image 62, for example, in a case shown in Fig, 11, is a direction including a right side direction bilaterally symmetrical to the first position 62*b* close to the left side. Specifically, as in the example shown in FIG. 11, the first direction is a direction directed in a second position 69*b* provided in an obliquely lower right region with respect to the first position 62*b*.

As shown in FIG. 10, the third guidance image 68*a* is displayed as, for example, an arrow image directed from the first position 62*a* close to the right side to the second position 69*a* that is an obliquely lower left instructed position. The third guidance image 68*a* is displayed as an image that prompts the user M to perform a continuous position instruction operation in the first direction directed from the first position 62*a* to the second position 69*a*. The continuous position instruction operation is, for example, a swiping operation directed from the first position 62*a* to the second position 69*a*. Similarly, as shown in FIG. 11, the third guidance image 68*b* is displayed as, for example, an arrow image directed from the first position 62*b* close to the left side to the second position 69*b* that is an obliquely lower right instructed position. The third guidance image 68*b* is displayed as an image that prompts the user M to perform a continuous position instruction operation in the first direction directed from the first position 62*b* to the second position 69*b*. Further, a guidance message 63*c* for guiding the continuous position instruction operation indicating that "please move downward while touching screen" is displayed below the third guidance image 68*a*, 68*b*.

In this way, when the first position 62*a* close to the right side is touched, after the second guidance image 67*a* is displayed, the arrow image for guiding a swiping operation toward a lower left side is displayed. Further, when the first position 62*b* close to the left side is touched, after the second guidance image 67*b* is displayed, the arrow image for guiding a swiping operation toward a lower right side is displayed. The second guidance image 67*a*, 67*b* displayed at the first position 62*a*, 62*b* is a guidance image serving as a starting point of the continuous position instruction operation (swiping operation).

Next, the processor 81 determines whether the swiping operation is performed from the position at which the second guidance image 67*a*, 67*b* is displayed in the first direction, that is, in the direction indicated by the arrow image of the third guidance image 68*a*, 68*b* (step S16).

In step S16, when the swiping operation is not performed (step S16: No), the processor 81 repeats the processing of step S16 and waits until the swiping operation is performed.

In step S16, when the swiping operation is performed (step S16: Yes), the processor 81 displays a fourth guidance image 70 directed in a second direction corresponding to the position at which the second guidance image 67*a*, 67*b* is displayed, that is, the position touched by the user M (step S17).

Figure 12:
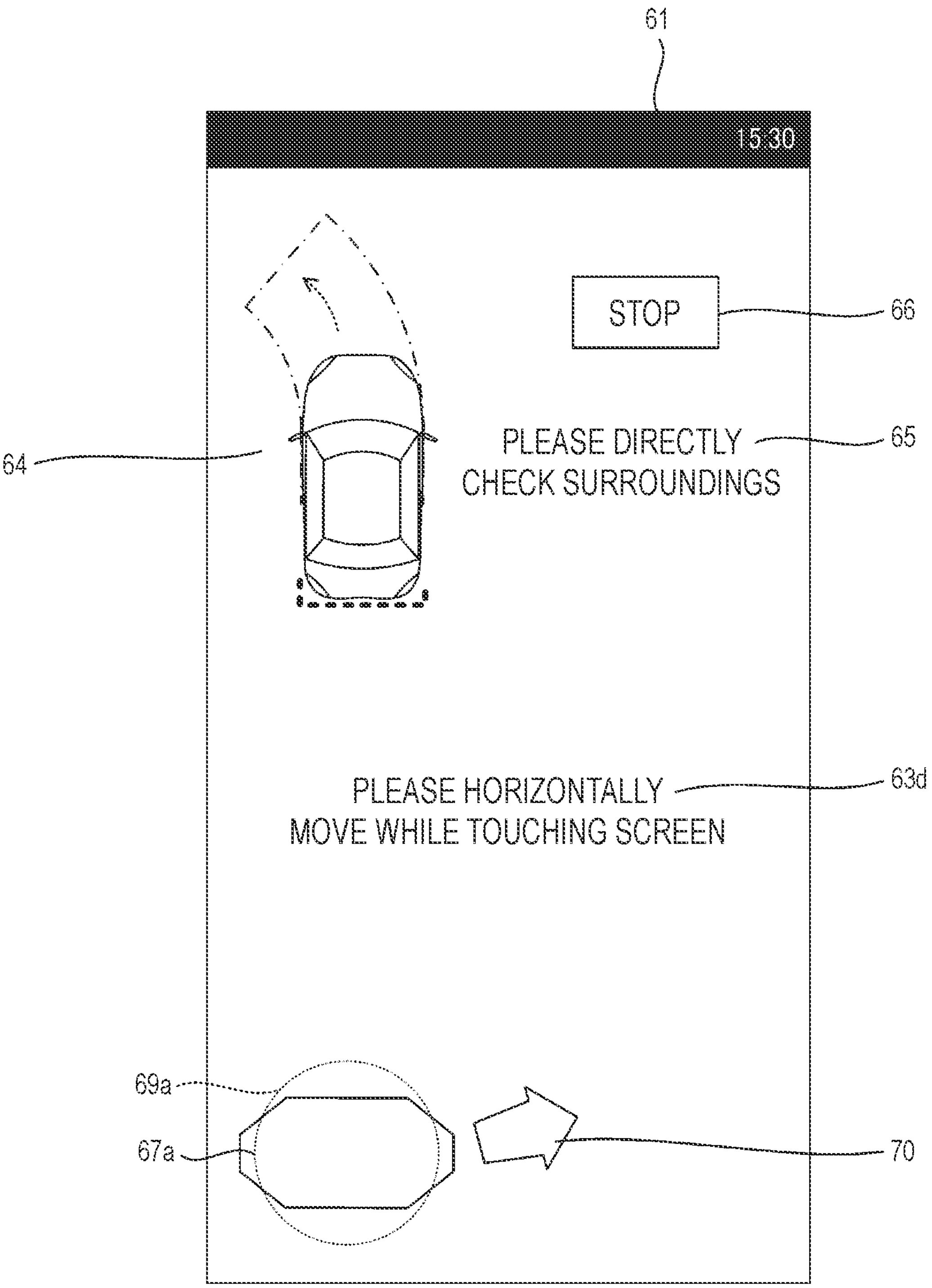
FIG. 12 is a diagram showing an example of an image displayed on the smartphone that performs the parking-space-leaving instruction control on the vehicle.

For example, when the swiping operation is performed from the first position 62*a* at which the second guidance image 67*a* is displayed in the first direction, as shown in FIGS. 10 and 12, the second guidance image 67*a* displayed at the first position 62*a* is moved to and displayed at the obliquely lower left second position 69*a*. The fourth guidance image 70 is displayed from the position of the second guidance image 67*a* moved to and displayed at the second position 69*a* in the second direction.

The second direction corresponding to the position at which the second guidance image 67*a* is displayed is a direction corresponding to the first position 62*a* close to the right side touched by the user M on the first guidance image 62. Further, the second direction is a direction different from the first direction directed from the first position 62*a* to the obliquely lower left second position 69*a* and shown in FIG. 10, that is, a direction different from the direction indicated by the third guidance image 68*a*.

Therefore, when the swiping operation is performed from the first position 62*a* at which the second guidance image 67*a* is displayed in the first direction (the direction toward the second position 69*a*), as shown in FIG. 12, the fourth guidance image 70 is displayed as an arrow image directed from the position of the second guidance image 67*a* displayed at the second position 69*a* in, for example, a right direction different from the first direction (the direction indicated by the third guidance image 68*a*), The fourth guidance image 70 is displayed as an image that prompts the user M to perform a continuous position instruction operation in the second direction different from the first direction. The continuous position instruction operation is, for example, a swiping operation directed from the second position 69*a* in the right direction. Further, above the fourth guidance image 70, a guidance message 63*d* for guiding a continuous position instruction operation indicating that "please horizontally move while touching screen" is displayed.

Although illustration is omitted, when the swiping operation is performed from the first position 62*b* at which the second guidance image 67*b* is displayed in the first direction (the direction toward the second position 69*b*), the second direction is a direction different from the obliquely lower right direction (first direction) indicated by the arrow image of the third. guidance image 68*b* shown in FIG. 11. The fourth guidance image 70 is displayed as an arrow image directed from a position of the second guidance image 67*b* displayed at the second position 69*b* in, for example, a left direction.

In this way, when the first position 62*a* close to the right side is touched, after the second guidance image 67*a* is moved to and displayed at the obliquely lower left second position 69*a,* the arrow image for guiding the swiping operation in the right direction is displayed. Further, when the first position 62*b* close to the left side is touched, after the second guidance image 67*b* is moved to and displayed at the obliquely lower right second position 69*b,* the arrow image for guiding the swiping operation in the left direction is displayed.

For example, in FIG. 10, the fourth guidance image 70 is displayed so as to be directed in the second direction different from the first direction before the instructed position based on the swiping operation in the first direction, that is, a tip end of the third guidance image 68*a* indicated by the arrow image reaches an end portion of the smartphone screen 61 (before the tip end of the third guidance image 68*a* protrudes from the smartphone screen 61). Further, when a distance of the instructed position based on the swiping operation in the first direction, that is, a length of the third guidance image 68*a* indicated by the arrow image exceeds a predetermined length, the fourth guidance image 70 may be displayed so as to be directed in the second direction different from the first direction.

Next, the processor 81 determines whether the swiping operation is performed from the second position 69*a,* 69*b* at which the second guidance image 67*a,* 67*b* is displayed in the second direction, that is, in the direction indicated by the arrow image of the fourth guidance image 70 (step S18).

In step S18, when the swiping operation is not performed (step S18: No), the processor 81 repeats the processing of step S18 and waits until the swiping operation is performed.

In step S18, when the swiping operation is performed (step S18: Yes), the processor 81 displays a fifth guidance image 71 in a rotation direction corresponding to the position at which the second guidance image 67*a,* 67*b* is first displayed, that is, the position at which the touch operation is started (step S19).

Figure 13:
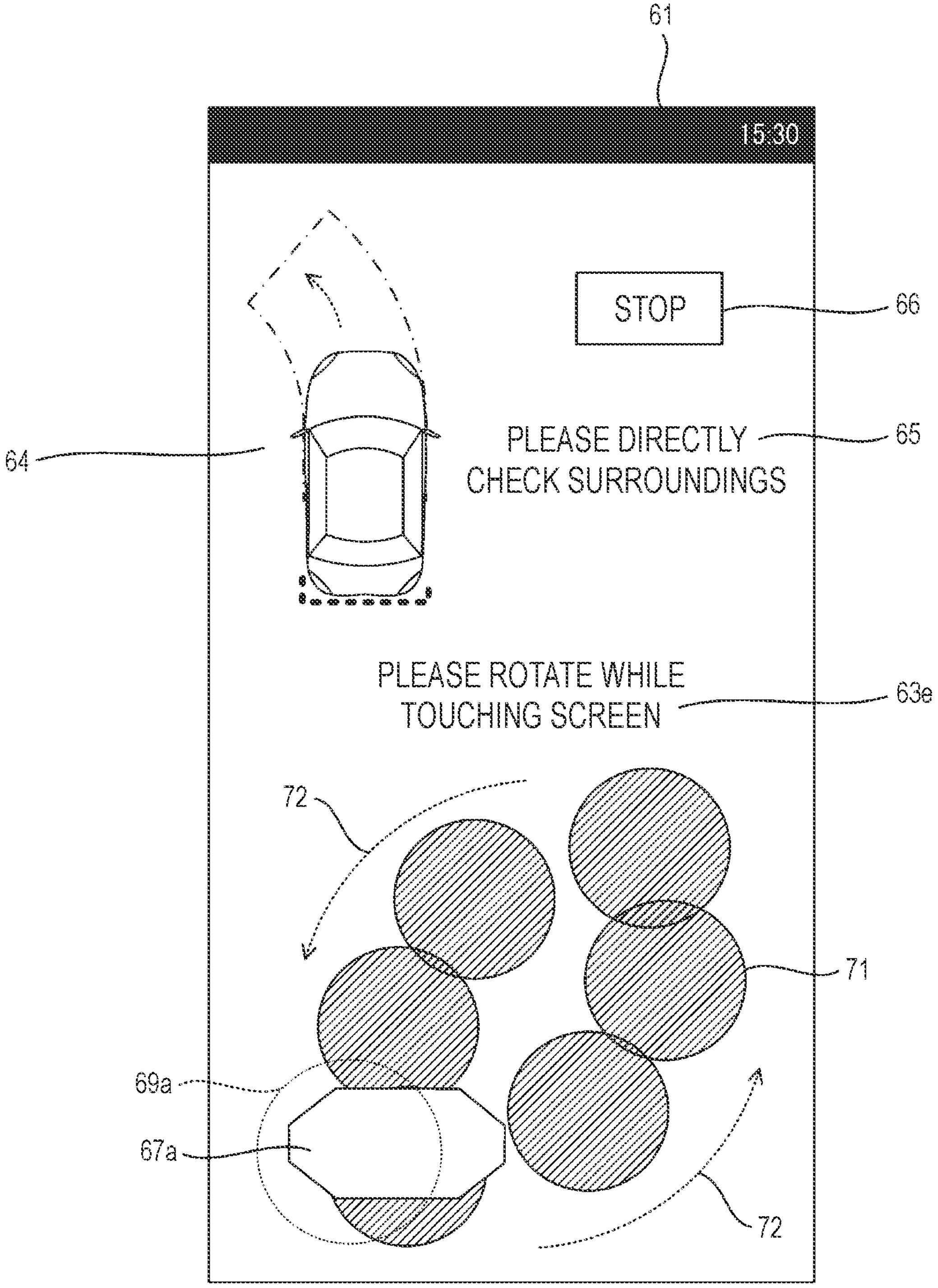
FIG. 13 is a diagram showing an example of an image displayed on the smartphone that performs the parking-space-leaving instruction control on the vehicle.

For example, a rotation direction corresponding to the position at which the second guidance image 67*a* is displayed is a rotation direction corresponding to the first position 62*a* close to the right side touched by the user M on the first guidance image 62. When the first position 62*a* close to the right side is touched, a rotation direction corresponding thereto is left rotation. At this time, the fifth guidance image 71 of the left rotation is displayed on the smartphone screen 61. Specifically, as shown in FIG. 13, when the first position 62*a* close to the right side is touched, the fifth guidance image 71 of the left rotation as indicated by an arrow 72 is displayed. For example, the fifth guidance image 71 is displayed such that six spheres perform the left rotation. The fifth guidance image 71 is displayed so as to rotate from the position of the second guidance image 67*a* displayed at the second position 69*a.* The fifth guidance image 71 is displayed as an image that prompts the user M to perform a rotation instruction operation for generating the left rotation. The rotation instruction operation for generating the left rotation is, for example, a rotational swiping operation of sliding counterclockwise. Further, above the fifth guidance image 71, a guidance message 63*e* for guiding a rotation instruction operation indicating that "please rotate while touching screen" is displayed.

Although illustration is omitted, when the first position 62*b* close to the left side is touched, the fifth guidance image 71 of right rotation corresponding thereto is displayed. Specifically, the fifth guidance image 71 is displayed such that the six spheres perform the right rotation from the position of the second guidance image 67*b* displayed at the second position 69*b* of FIG. 11.

In this way, when the first position 62*a* close to the right side is touched, a plurality of sphere images of the left rotation for guiding the counterclockwise rotational swiping operation from the position of the second guidance image 67*a* moved to the second position 69*a* are displayed. Further, when the first position 62*b* close to the left side is touched, a plurality of sphere images of the left rotation for guiding a clockwise rotational swiping operation from the position of the second guidance image 67*b* moved to the second position 69*b* are displayed. The second guidance image 67*a,* 67*b* displayed at the first position 62*a,* 62*b* is a guidance image serving as a starting point of the rotation instruction operation (rotational swiping operation).

Next, the processor 81 proceeds to processing shown in FIG. 7, and determines whether the rotational swiping operation is started (step S20).

In step S20, when the rotational swiping operation is not started (step S20: No), the processor 81 repeats the processing of step S20 and waits until the rotational swiping operation is started.

In step S20, when the rotational swiping operation is started (step S20: Yes), the processor 81 hides the fifth guidance image 71 displayed on the smartphone screen 61, and displays an instruction icon 73 that moves by following an instructed position based on the rotational swiping operation (step S21).

Figure 14:
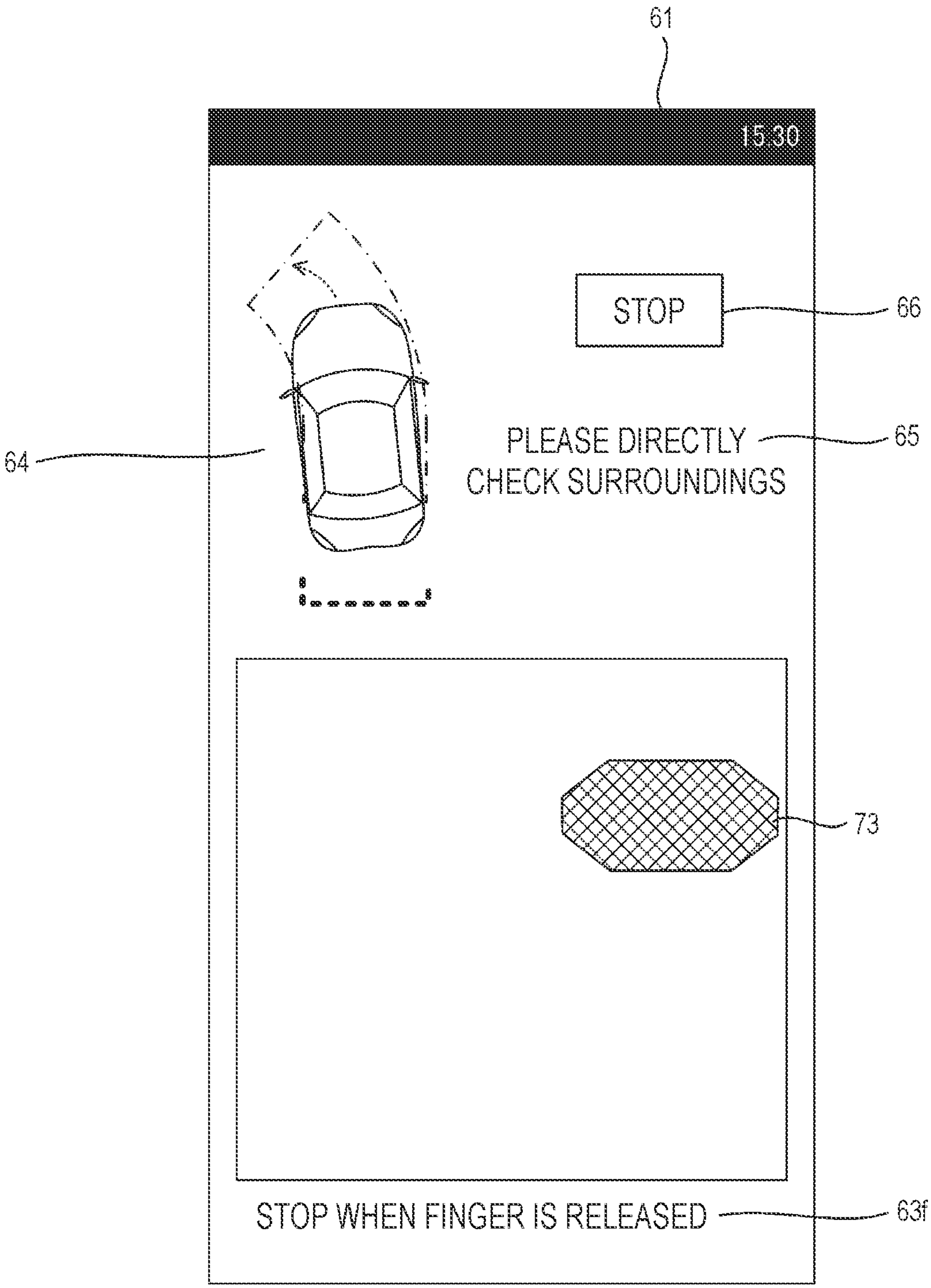
FIG. 14 is a diagram showing an example of an image displayed on the smartphone that performs the parking-space-leaving instruction control on the vehicle.

For example, as shown in FIG. 14, the fifth guidance image 71 (see FIG. 13) displayed using six rotating spheres is hidden, and the instruction icon 73 representing an automatic parking-space-leaving instruction of the vehicle 10 is displayed. The instruction icon 73 moves by following a touched position of the user M on the smartphone screen 61. The instruction icon 73 is an instruction icon in which the second guidance image 67*a* displayed in FIG. 13 moves by following a finger movement based on the rotational swiping operation of the user M. Further, a guidance message 63*f* for stopping the automatic parking-space-leaving of the vehicle 10 indicating that "stop when finger is released" is displayed. Accordingly, when the rotational swiping operation is performed on the smartphone screen 61, the instruction icon 73 rotationally moves by following a touched position thereof, and the vehicle 10 starts to move according to the rotational movement. Further, when the finger that touches the smartphone screen 61 is released from the smartphone screen 61, the movement of the vehicle 10 is stopped.

Next, the processor 81 starts the automatic parking-space-leaving of the vehicle 10 by transmitting a parking-space-leaving start signal to the vehicle 10 (step S22), Accordingly, the automatic parking control unit 55 of the vehicle 10 starts the automatic parking-space-leaving of the vehicle 10 according to the parking-space-leaving start signal transmitted from the smartphone 60. When the automatic parking-space-leaving of the vehicle 10 is started, as shown in FIG. 14, an image corresponding to the movement of the vehicle 10, that is, the execution state image 64 of the vehicle 10 that leaves the parking space P is displayed.

Next, the processor 81 determines whether the rotational swiping operation on the smartphone screen 61 is stopped (step S23).

In step S23, when the rotational swiping operation is stopped (step S23: Yes), the processor 81 stops the automatic parking-space-leaving of the vehicle 10 by transmitting a parking-space-leaving stop signal to the vehicle 10 (step S24).

Next, the processor 81 determines whether the rotational swiping operation on the smartphone screen 61 is resumed (step S25).

In step S25, when the rotational swiping operation is not resumed (step S25: No), the processor 81 waits until the rotational swiping operation is resumed.

In step S25, when the rotational swiping operation is resumed (step S25: Yes), the processor 81 resumes the instruction control of the automatic parking-space-leaving of the vehicle 10 (step S26), returns to step S23, and repeats the processing.

In contrast, in step S23, when the rotational swiping operation is not stopped (step S23: No), the processor 81 determines whether the automatic parking-space-leaving of the vehicle 10 is completed (step S27). The completion of the automatic parking-space-leaving of the vehicle 10 can be recognized based on, for example, a parking-space-leaving completion signal transmitted from the automatic parking control unit 55 of the vehicle 10. The automatic parking-space-leaving is completed, for example, when the vehicle 10 is moved to an outside of the parking space P.

In step S27, when the automatic parking-space-leaving of the vehicle 10 is not completed (step S27: No), the processor 81 returns to step S23 and repeats the processing, In step S27, when the automatic parking-space-leaving of the vehicle 10 is completed (step S27: Yes), the processor 81 ends the processing of the parking-space-leaving instruction control. In the middle of a series of processing described above, for example, when the stop button 66 is touched by the user M, the processor 81 ends the processing of the parking-space-leaving instruction control.

As described above, the processor 81 of the smartphone 60 causes the smartphone screen 61 to display the first guidance image 62 including the long horizontal bar that extends in the left-right direction, and then causes the smartphone screen 61 to display the second guidance image 67*a*, 67*b* that has the length in the left-right direction shorter than that of the first guidance image 62 and that serves as the starting point of the specific operation including the rotational swiping operation (rotation instruction operation) at the first position 62*a*, 62*b* touched by the user M on the first guidance image 62. Accordingly, the second guidance image 67*a*, 67*b* is displayed at the first position 62*a*, 62*b* touched by the user M on the first guidance image 62 that extends in the left-right direction, and the position of the second guidance image 67*a*, 67*b* serves as the starting point of the specific operation (for example, the rotational swiping operation) for instructing the automatic parking-space-leaving control of the vehicle 10. Therefore, even if the user M operates the smartphone screen 61 with a finger of either a left hand or a right hand, it is possible to easily perform the specific operation including the rotational swiping operation.

The processor 81 of the smartphone 60 causes the smartphone screen 61 to display, together with the second guidance image 67*a*, 67*b*, the third guidance image 68*a*, 68*b* that prompts the swiping operation (continuous position instruction operation) in the oblique first direction including the direction directed from the first position 62*a*, 62*b* to the second position 69*a*, 69*b* bilaterally symmetrical to the first position 62*a*, 62*b*. Therefore, with the first position at which the second guidance image is displayed being set as the starting point, the swiping operation in the first direction can be easily performed by being guided by the third guidance image 68*a*, 68*b* displayed on the smartphone screen 61, Further, when the first position 62*a* close to the right side on the smartphone screen 61 is touched, the third guidance image 68*a* directed to the obliquely lower left second position 69*a* is displayed, and when the first position 62*b* close to the left side on the smartphone screen 61 is touched, the third guidance image 68*b* directed to the obliquely lower right second position 69*b* is displayed. Therefore, the swiping operation can be easily performed even if the user M operates the smartphone screen 61 with the finger of either the left hand or the right hand.

When the swiping operation in the first direction is performed, the processor 81 of the smartphone 60 causes the smartphone screen 61 to display the fourth guidance image 70 that prompts the continuous position instruction operation (swiping operation) in the second direction different from the first direction. Therefore, a next swiping operation for which an end position of the swiping operation in the first direction is set as the starting point can be easily performed by being guided by the fourth guidance image 70 displayed on the smartphone screen 61.

The processor 81 of the smartphone 60 causes the fourth guidance image 70 to be displayed before the instructed position based on the swiping operation in the first direction reaches the end portion of the smartphone screen 61. Accordingly, before the movement of the hand of the user M in the first direction based on the swiping operation becomes large, the guidance display is switched such that the swiping operation in the second direction different from the first direction is formed. Therefore, it is possible to prevent an increase in a stroke (operation distance) of the swiping operation, and to reduce a burden on the user M.

When the movement distance of the instructed position based on the swiping operation in the first direction exceeds a predetermined distance, the processor 81 of the smartphone 60 causes the fourth guidance image 70 to be displayed, Also in this case, the guidance display is switched before the movement of the hand of the user M becomes large, so that it is possible to prevent an increase in the stroke (operation distance) of the swiping operation, and to reduce the burden on the user M.

When the swiping operation in the second direction is performed, the processor 81 of the smartphone 60 causes the smartphone screen 61 to display the fifth guidance image 71 that prompts the rotational swiping operation in a predetermined rotation direction corresponding to the first position

62*a*, 62*b*. Accordingly, since the rotation direction of the rotational swiping operation is set according to the first position 62*a*, 62*b* touched by the user M, even if the user M operates the smartphone screen 61 with the finger of either the left hand or the right hand, it is possible to perform the rotational swiping operation in a natural direction, and to reduce the burden on the user M.

When the rotational swiping operation is started, the processor 81 of the smartphone 60 causes the smartphone screen 61 to hide the fifth guidance image 71, and to display the instruction icon 73 indicating the touched position based on the rotational swiping operation. In this way, since the fifth guidance image 71 is hidden after the rotational swiping operation is started, for example, even if it is necessary to stop the movement of the vehicle 10, it is possible to prevent excessive movement of the vehicle 10 due to the user M continuing the rotational swiping operation by being guided by the fifth guidance image 71. Further, since the instruction icon 73 indicating the touched position based on the rotational swiping operation is displayed instead of displaying the fifth guidance image 71, it is possible to prevent the user M from feeling uneasy about whether he or she can normally input an operation.

The processor 81 of the smartphone 60 causes the smartphone screen 61 to display the execution state image 64 indicating the execution state of the movement control, and to display the guidance images and the image of the instruction icon 73 below the execution state image 64. Accordingly, the touch operation of the parking-space-leaving instruction can be performed in the lower region of the smartphone screen 61, so that it is possible to improve operability of the smartphone screen 61, and to prevent a situation in which the execution state display may be hidden by the finger or the hand of the user M.

Figure 15:
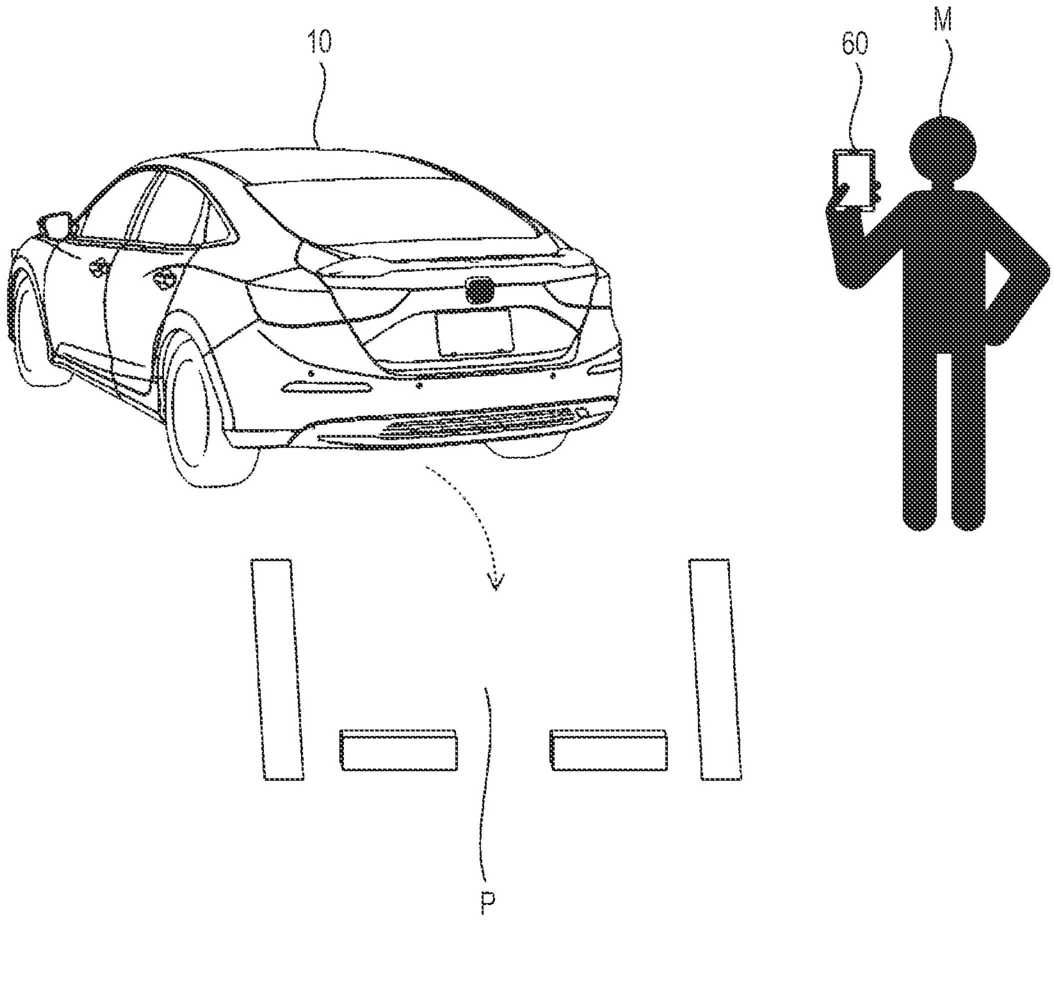
FIG. 15 is a diagram showing a state where the vehicle is under parking instruction control by using the smartphone from the outside of the vehicle.

In the movement instruction control performed by the processor 81, the automatic parking-space-leaving of the vehicle 10 has been described, but the movement instruction control can also be applied to, for example, automatic parking of the vehicle 10. FIG. 15 is a diagram showing a situation in which the user M of the vehicle 10 issues a parking instruction for automatically park the vehicle 10 in the parking space P by using the smartphone 60 carried by the user M from the outside of the vehicle 10.

Figure 16:
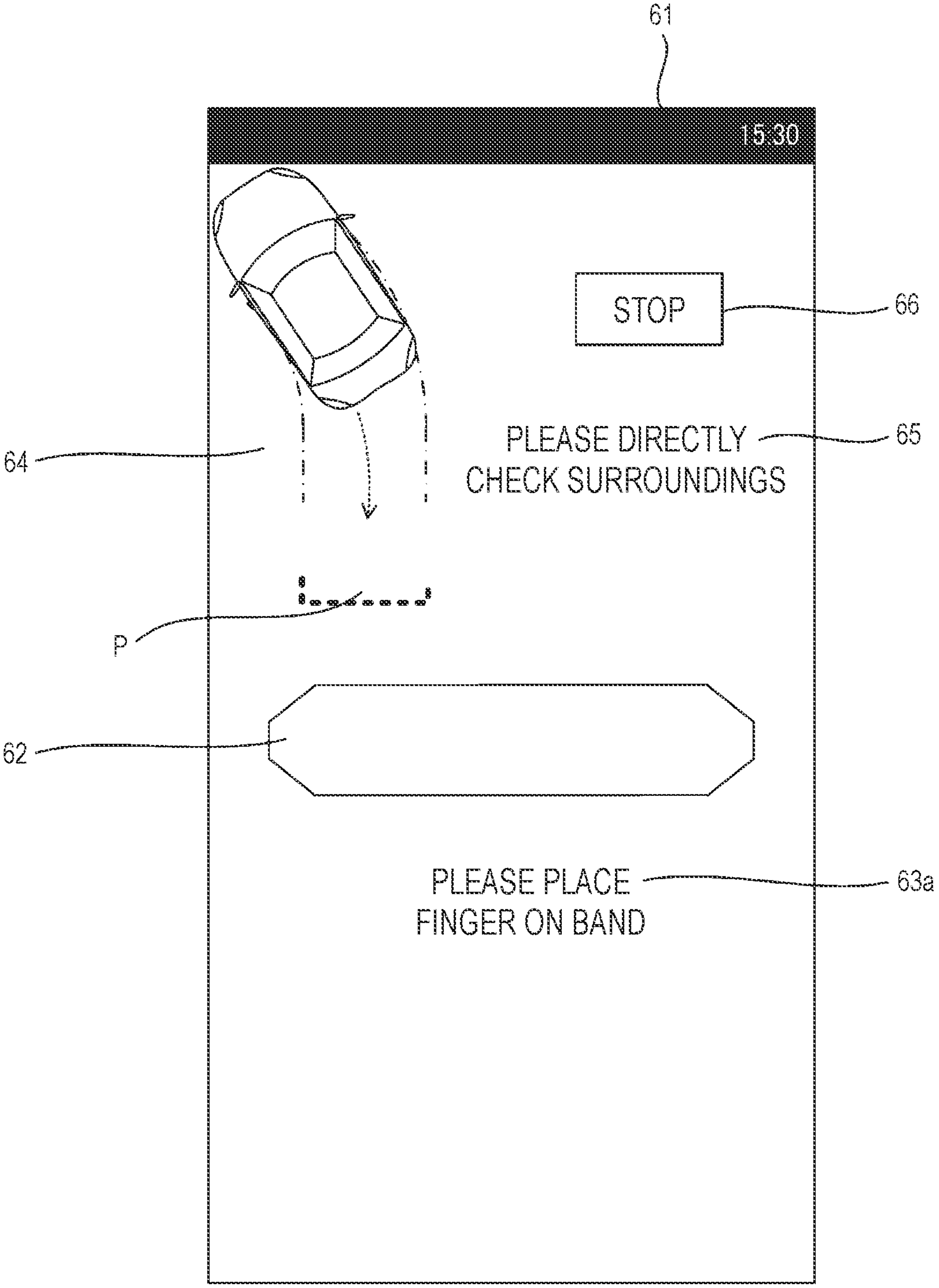
FIG. 16 is a diagram showing an example of an image displayed on the smartphone that performs the parking instruction control on the vehicle.

FIG. 16 shows an example of an image including a first guidance image displayed on the smartphone screen 61 when the processing of the parking-space-leaving instruction control shown in FIGS. 6 and 7 is applied to parking instruction control and an automatic parking start instruction is received in steps S11 and S12. As shown in FIG. 16, the smartphone screen 61 displays the first guidance image 62 touched by the user M, and displays the vehicle 10 that is parked in front of the parking space P and that waits for automatic parking control.

Although the embodiment of the present disclosure has been described above, the present disclosure is not limited to the above-described embodiment, and modifications, improvements, and the like can be made as appropriate.

For example, in the above-described embodiment, an example in which the moving object is a vehicle (four-wheeled automobile) has been described, but the present disclosure is not limited thereto. For example, the moving object may be a vehicle such as a two-wheeled vehicle or a Segway. Further, the concept of the present disclosure can be applied not only to a vehicle but also to a robot, a ship, an aircraft, and the like that are provided with a driving source and that are movable by power of the driving source.

The control method described in the above-described embodiment can be implemented by a computer executing a control program prepared in advance. The control program is recorded in a computer-readable storage medium and is executed by being read from the storage medium. Further, the control program may be provided in a form stored in a non-transitory storage medium such as a flash memory, or may be provided via a network such as the Internet. The computer that executes the control program may be provided in a control device, may be provided in an electronic device such as a smartphone, a tablet terminal, or a personal computer that can communicate with the control device, or may be provided in a server device that can communicate with the control device and the electronic device.

In the present specification, at least the following matters are described. In parentheses, the corresponding components or the like in the above-described embodiment are shown, but the present disclosure is not limited thereto.

(1) An information terminal (the smartphone 60) carried by a user (the user M) of a moving object (the vehicle 10), the information terminal including:

a display (the smartphone screen 61) configured to perform a position instruction operation on a display image; and a controller (the processor 81) configured to perform movement control of the moving object based on a specific operation including a rotation instruction operation (the rotational swiping operation) of the user on the display, in which after the controller causes the display to display a first guidance image (the first guidance image 62) that extends in a left-right direction, the controller causes the display to display, at a first position (the first position 62*a*, 62*b*) instructed by the user on the first guidance image, a second guidance image (the second guidance image 67*a*, 67*b*) that has a length in a left-right direction shorter than that of the first guidance image and that serves as a starting point of the specific operation.

According to (1), since the second guidance image is displayed at the first position instructed by the user on the first guidance image that extends in the left-right direction, and the position of the second guidance image serves as the starting point of the specific operation for instructing the movement control of the moving object, even if the user operates the display with a finger of either a left hand or a right hand, it is possible to easily perform the specific operation including the rotation instruction operation.

(2) The information terminal according to (1), in which the controller causes the display to display, together with the second guidance image, a third guidance image (the third guidance image 68*a*, 68*b*) that prompts a continuous position instruction operation (the swiping operation) in an oblique first direction including a direction directed from the first position to a second position (the second position 69*a*, 69*b*) bilaterally symmetrical to the first position.

According to (2), with the first position at which the. second guidance image is displayed being set as the starting point, it is possible to easily perform the continuous position instruction operation in the first direction.

(3) The information terminal according to (2), in which when the continuous position instruction operation in the first direction is performed, the controller causes the display to display a fourth guidance image (the fourth guidance image 70) that prompts a continuous position instruction operation in a second direction different from the first direction.

According to (3), it is possible to easily perform the rotation instruction operation for which the end position of the continuous position instruction operation in the first direction is set as the starting point.

(4) The information terminal according to (3), in which the controller causes the fourth guidance image to be displayed before an instructed position based on the continuous position instruction operation in the first direction reaches an end portion of the display.

According to (4), it is possible to prevent an increase in an operation distance (a stroke of the swiping), and to reduce a burden on the user.

(5) The information terminal according to (3), in which when a movement distance of an instructed position based on the continuous position instruction operation in the first direction exceeds a predetermined distance, the controller causes the fourth guidance image to be displayed.

According to (5), it is possible to prevent an increase in an operation distance (a stroke of the swiping), and to reduce a burden on the user.

(6) The information terminal according to any one of (3) to (5), in which when the continuous position instruction operation in the second direction is performed, the controller causes the display to display a fifth guidance image (the fifth guidance image 71) that prompts the rotation instruction operation in a predetermined rotation direction corresponding to the first position.

According to (6), since the rotation direction of the rotation instruction operation is set according to the first position instructed by the user, even if the user operates the display with a finger of either a left hand or a right hand, it is possible to perform the rotation instruction operation in a natural direction, and to reduce a burden on the user.

(7) The information terminal according to (6), in which when the rotation instruction operation is started, the controller causes the display to hide the fifth guidance image, and causes the display to display an icon indicating an instructed position based on the rotation instruction operation, According to (7), since the fifth guidance image is hidden after the rotation instruction operation is started, even if it is necessary to stop the movement of the moving object, it is possible to prevent a situation in which the movement of the moving object is not stopped due to the user continuing the rotation instruction operation by being guided by the fifth guidance image. Further, since the icon indicating the instructed position based on the rotation instruction operation is displayed instead of displaying the fifth guidance image, it is possible to prevent the user from feeling uneasy about whether he or she can normally input an operation.

(8) The information terminal according to any one of (1) to (7), in which the controller causes the display to display an execution state image indicating an execution state of the movement control, and causes the display to display the first guidance image below the execution state image.

According to (8), the user can perform an operation with a finger in a lower portion of the display, so that it is possible to improve operability, and to prevent a situation in which the execution state display may be hidden by a finger or a hand of the user (9) A control system including:

an information terminal that is carried by a user of a moving object, that includes a display configured to perform a position instruction operation on a display image, and that performs movement control of the moving object based on a specific operation including a rotation instruction operation of the user on the display; and a control device configured to cause the moving object to move according to the movement control, in which after the information terminal causes the display to display a first guidance image that extends in a left-right direction, the information terminal causes the display to display a second guidance image that has a length in a left-right direction shorter than that of the first guidance image and that serves as a starting point of the specific operation at a first position instructed by the user on the first guidance image.

According to (9), since the second guidance image is displayed at the first position instructed by the user on the first guidance image that extends in the left-right direction, and the position of the second guidance image serves as the starting point of the specific operation for instructing the movement control of the moving object, even if the user operates the display with a finger of either a left hand or a right hand, it is possible to easily perform the specific operation including the rotation instruction operation.

(10) A control method by an information terminal that is carried by a user of a moving object, and that includes a display configured to perform a position instruction operation on a display image, and a controller configured to perform movement control of the moving object based on a specific operation including a rotation instruction operation of the user on the display, the control method including:

causing, by the controller, the display to display a first guidance image that extends in a left-right direction, causing, by the controller, the display to display a second guidance image that has a. length in a left-right direction shorter than that of the first guidance image and that serves as a starting point of the specific operation at a first position instructed by the user on the first guidance image, According to (10), since the second guidance image is displayed at the first position instructed by the user on the first guidance image that extends in the left-right direction, and the position of the second guidance image serves as the starting point of the specific operation for instructing the movement control of the moving object, even if the user operates the display with a finger of either a left hand or a right hand, it is possible to easily perform the specific operation including the rotation instruction operation.

The invention claimed is:

1. An information terminal carried by a user of a moving object, the information terminal comprising:

a display configured to detect a touch on a display image; and a controller configured to perform movement control of the moving object based on a specific operation including a series of touch operations of the user on the display, wherein after the controller causes the display to display a first guidance image that extends in a left-right direction, the controller determines whether a first position on the first guidance image where the user has touched is closer to a right side or a left side, and causes the display to display, at the first position, a second guidance image that has a length in a left-right direction shorter than that of the first guidance image and that serves as a starting point of the specific operation, and wherein the second guidance image is initially displayed only after the determination of whether a first position on the first guidance image where the user has touched is closer to the right side or the left side.

2. The information terminal according to claim 1, wherein the controller sets a second position on a side facing the first position in the left-right direction, and causes the display to display, together with the second guidance image, a third guidance image that prompts a continuous touch operation in an oblique first direction including a direction directed from the first position to the second position.

3. The information terminal according to claim 2, wherein when the continuous touch operation in the first direction is performed, the controller causes the display to display a fourth guidance image that prompts a continuous touch operation in a second direction different from the first direction.

4. The information terminal according to claim 3, wherein the controller causes the fourth guidance image to be displayed before an instructed position based on the continuous touch operation in the first direction reaches an end portion of the display.

5. The information terminal according to claim 3, wherein when a movement distance of an instructed position based on the continuous touch operation in the first direction exceeds a predetermined distance, the controller causes the fourth guidance image to be displayed.

6. The information terminal according to claim 3, wherein the specific operation includes a rotation instruction operation of the user on the display, and wherein when the continuous touch operation in the second direction is performed, the controller causes the display to display a fifth guidance image that prompts the rotation instruction operation in a predetermined rotation direction corresponding to the first position.

7. The information terminal according to claim 6, wherein when the rotation instruction operation is started, the controller causes the display to hide the fifth guidance image, and causes the display to display an icon indicating an instructed position based on the rotation instruction operation.

8. The information terminal according to claim 1, wherein the controller causes the display to display an execution state image indicating an execution state of the movement control, and causes the display to display the first guidance image below the execution state image.

9. A control system comprising:
an information terminal that is carried by a user of a moving object, that includes a display configured to detect a touch on a display image, and that performs movement control of the moving object based on a specific operation including a series of touch operations of the user on the display; and
a control device configured to cause the moving object to move according to the movement control,
wherein after the information terminal causes the display to display a first guidance image that extends in a left-right direction, the information terminal determines whether a first position on the first guidance image where the user has touched is closer to a right side or a left side, and causes the display to display, at the first position, a second guidance image that has a length in a left-right direction shorter than that of the first guidance image and that serves as a starting point of the specific operation, and
wherein the second guidance image is initially displayed only after the determination of whether a first position on the first guidance image where the user has touched is closer to the right side or the left side.

10. A control method by an information terminal that is carried by a user of a moving object, and that includes a display configured to detect a touch on a display image, and a controller configured to perform movement control of the moving object based on a specific operation including a series of touch operations of the user on the display, the control method comprising:
causing, by the controller, the display to display a first guidance image that extends in a left-right direction, and
determining whether a first position on the first guidance image where the user has touched is closer to a right side or a left side, and causing, by the controller, the display to display, at the first position, a second guidance image that has a length in a left-right direction shorter than that of the first guidance image and that serves as a starting point of the specific operation, and
wherein the second guidance image is initially displayed only after the determination of whether a first position on the first guidance image where the user has touched is closer to the right side or the left side.

11. The information terminal according to claim 1, wherein
the specific operation includes a rotation instruction operation of the user on the display,
the controller performs movement control of the moving object while the rotation instruction operation is performed, and stops the movement control of the moving object when the rotation instruction operation is stopped,
the controller causes the display to display a fifth guidance image that prompts the rotation instruction operation, and
the controller causes the display to hide the fifth guidance image, when the rotation instruction operation is started.

* * * * *